US007872218B2

(12) United States Patent
Endo et al.

(10) Patent No.: US 7,872,218 B2
(45) Date of Patent: Jan. 18, 2011

(54) RADIATION IMAGE PICKUP APPARATUS AND ITS CONTROL METHOD

(75) Inventors: Tadao Endo, Honjo (JP); Toshio Kameshima, Kumagaya (JP); Tomoyuki Yagi, Tokyo (JP); Katsuro Takenaka, Kodama-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/398,528

(22) Filed: Mar. 5, 2009

(65) Prior Publication Data
US 2009/0166547 A1 Jul. 2, 2009

Related U.S. Application Data

(62) Division of application No. 11/127,077, filed on May 12, 2005, now Pat. No. 7,514,690.

(30) Foreign Application Priority Data
May 18, 2004 (JP) ............................. 2004-148051

(51) Int. Cl.
*H01L 27/00* (2006.01)
(52) U.S. Cl. ............................. 250/208.1; 250/370.08
(58) Field of Classification Search .............. 250/208.1, 250/370.14, 214 R, 214.1; 348/308, 272, 348/281, 294, 302, 300, 303–307, 241, 243; 399/130, 168, 177; 358/501, 513, 514, 448
See application file for complete search history.

(56) References Cited

U.S. PATENT DOCUMENTS

| | | | | |
|---|---|---|---|---|
| 6,075,256 A * | 6/2000 | Kaifu et al. | .................... | 257/53 |
| 6,600,160 B2 | 7/2003 | Kobayashi et al. | ...... | 250/370.14 |
| 7,012,260 B2 * | 3/2006 | Endo | ....................... | 250/370.11 |
| 7,224,390 B2 * | 5/2007 | Kokubun et al. | ............ | 348/308 |
| 7,514,690 B2 * | 4/2009 | Endo et al. | .............. | 250/370.14 |
| 2001/0030704 A1 * | 10/2001 | Kimura | ....................... | 348/308 |
| 2002/0008190 A1 | 1/2002 | Endo et al. | ............... | 250/208.1 |

(Continued)

FOREIGN PATENT DOCUMENTS

JP     8-116044     5/1996

(Continued)

*Primary Examiner*—Que T Le
*Assistant Examiner*—Jennifer Bennett
(74) *Attorney, Agent, or Firm*—Fitzpatrick, Cella, Harper & Scinto

(57) ABSTRACT

Each pixel is provided with a photoelectric converting device S1(1-1) or the like, a source-follower-type first transistor T1(1-1) or the like, a second transistor Te(1-1) to be turned on when reading an electrical signal from a pixel selected by a shift register SR1 for each line and outputting the signal to a readout circuit unit and a third transistor T3(1-1) to be turned on when resetting a photoelectric converting device set to a pixel selected by a shift register SR1 for each line. Moreover, a bias power source for supplying a photoelectric conversion bias to a photoelectric converting device and a reset power source for supplying a reset bias to a photoelectric converting device are set in the readout circuit unit. By using the radiation image pickup apparatus and its control method, it is possible to improve the S/N ratio while restraining noises and preferably, it is possible to perform stable and high-speed dynamic-image photographing and restrain dark current.

12 Claims, 17 Drawing Sheets

U.S. PATENT DOCUMENTS

| | | | |
|---|---|---|---|
| 2003/0038242 A1* | 2/2003 | Endo | 250/370.14 |
| 2006/0119719 A1 | 6/2006 | Kameshima | 348/308 |

FOREIGN PATENT DOCUMENTS

| | | |
|---|---|---|
| JP | 9-64332 | 1/1997 |
| JP | 10-150182 | 6/1998 |
| JP | 2000-4399 | 1/2000 |
| JP | 2000-323699 | 11/2000 |
| JP | 2001-196572 | 7/2001 |
| JP | 2003-78124 | 3/2003 |
| JP | 2003-324213 | 11/2003 |
| JP | 2004-73450 | 3/2004 |

* cited by examiner

PRIOR ART

PRIOR ART

REFRESH MODE

PHOTOELECTRIC
CONVERTING MODE

SATURATING STATE

RADIATION IMAGE PICKUP APPARATUS AND ITS CONTROL METHOD

This is a divisional of application Ser. No. 11/127,077, filed May 12, 2005, claims benefit of that application under 35 U.S.C. §120, and claims benefit under 35 U.S.C. §119 of Japanese patent application no. 2004/148051, filed May 18, 2004. The entire content of each of the two mentioned prior applications is incorporated herein by reference.

BACKGROUND OF THE INVENTION

1. Field of the Invention

The present invention relates to a radiation image pickup apparatus and its control method, preferably used for medical diagnosis and industrial non-destructive inspection. In the case of the present invention, electromagnetic waves such as X-rays and γ-rays as well as beams of α and β particles are included in the term "radiation".

2. Description of the Related Art

Conventionally, an X-ray radiographing system set in a hospital includes a film photographing system for irradiating X-rays to a patient and exposing to the X-rays that have passed through the patient a film and an image processing system for converting X-rays into electrical signals and performing digital image processing. As one apparatus for realizing the image processing system, there is a radiation image pickup apparatus provided with a scintillator for converting X-rays into visible light and a photoelectric converting apparatus for converting visible light into electrical signals. X-rays that have passed through a patient are applied to a scintillator and the body information on the patient converted into visible light by the scintillator is output from the photoelectric converting apparatus as electrical signals. When the body information on the patient is converted into electrical signals, the electrical signals are digital-converted by an AD converter and X-ray image information for performing recording, display, printing and diagnosis can be handled as digital values.

Recently, a radiation image pickup apparatus is practically used which uses an amorphous silicon semiconductor thin film for a photoelectric converting apparatus.

FIG. 11 is a top view showing a conventional photoelectric converting substrate constituted by using an amorphous silicon semiconductor thin film for materials of an MIS-type photoelectric converting device and a switching device disclosed in U.S. Pat. No. 6,075,256B1 including wirings for connecting the devices. FIG. 12 is a sectional view taken along the line 12-12 in FIG. 11.

A photoelectric converting device 101 and a switching device 102 (amorphous silicon TFT (TFT: Thin Film Transistor); hereafter simply referred to as a "TFT") are formed on the same substrate 103 and the lower electrode of the photoelectric converting device is shared by a first metallic thin film layer 104 same as the lower electrode (gate electrode) of the TFT and the upper electrode of the photoelectric converting device is shared by a second metallic thin film layer 105 same as the upper electrodes (source electrode and drain electrode) of the TFT. Moreover, first and second metallic thin film layers also share a gate driving wiring 106 and a matrix signal wiring 107 in a photoelectric converting circuit. FIG. 12 shows the total of four pixels of 2×2 pixels as the number of pixels. Hatched portions in FIG. 12 are light receiving faces of a photoelectric converting device. Reference numeral 109 denotes a power source line for supplying a bias to a photoelectric converting device. Moreover, reference numeral 110 denotes a contact hole for connecting a photoelectric converting device with a TFT.

By using the configuration shown in FIG. 11 using amorphous silicon semiconductor as a main material, it is possible to form a photoelectric converting device, switching device, gate driving wiring and matrix signal wiring on the same substrate at the same time and provide a large-area photoelectric conversion circuit unit easily and inexpensively.

Then, device operations of a single photoelectric converting device are described below. FIGS. 13A to 13C are energy band diagrams for explaining device operations of the photoelectric converting device shown in FIGS. 11 and 12. This photoelectric converting device has two types of operation modes such as a refresh mode and a photoelectric converting mode depending on the way of applying a voltage to the first and second metallic thin film layers 104 and 105.

FIGS. 13A and 13B show operations of the refresh mode and operations of the photoelectric converting mode respectively and states in film thickness directions of layers as shown in FIG. 12. M1 denotes a lower electrode (G electrode) formed of the first metallic thin film layer 104 (such as Cr). An amorphous silicon nitride (a-SiNx) layer 111 is an insulating layer for preventing electrons and holes and passage of them, which requires a thickness not having a tunnel effect and is normally set to 500 Å or more. A hydrogeneration amorphous silicon (a-si:H) layer 112 is a photoelectric converting layer formed of an intrinsic semiconductor layer (i layer) not intentionally doped with a dopant. An $N^+$ layer 113 is a single conductivity-type carrier injection preventive layer made of non-singlecrystalline semiconductor such as an N-type a-Si:H layer formed to prevent injection of holes into the a-Si:H layer 112. Moreover, M2 denotes an upper electrode (D electrode) formed of the second metallic thin film layer 105 (such as A1).

FIG. 14 is a circuit diagram showing a two-dimensional configuration of a conventional photoelectric converting substrate constituted by using an amorphous silicon semiconductor thin film as the material of a photoelectric converting device and a switching device. However, to simplify the description, the configuration is shown by 9 pixels of 3×3.

In FIG. 14, S1-1 to S3-3 are photoelectric converting devices, T1-1 to T3-3 are switching devices, G1 to G3 are gate wirings for turning on/off the TFTs and M1 to M3 are signal wirings and a Vs line is a wiring for supplying an accumulated bias to the photoelectric converting devices. Electrodes at the black side of the photoelectric converting devices S1-1 to S3-3 are G electrodes and the opposite side is a D electrode. The D electrode is connected with a part of the Vs line. However, to bring light into the D electrode, a thin $N^+$ layer is used as the D electrode. In the case of this conventional example, the photoelectric converting devices S1-1 to S3-3, switching devices T1-1 to T3-3, gate wirings G1 to G3, signal wirings M1 to M3 and Vs line are included in a photoelectric conversion circuit unit 701. The Vs line is biased by a power source Vs. An SR1 is a shift register for applying a driving pulse voltage to the gate wirings G1 to G3 and a voltage Vcom for turning on a TFT is supplied from the outside. Moreover, a control signal VSC is a signal for supplying two types of biases to the Vs line of a photoelectric converting device, that is, the D electrode of the photoelectric converting device. The D electrode becomes Vref(V) when the control signal VSC is set to "Hi" and becomes Vs(V) when the control signal VSC is set to "Lo". A reading power source Vs(V) and refreshing power source Vref(V) are DC power sources and Vs is set to 9 V and Vref is set to 3 V.

A readout circuit unit 702 amplifies parallel signal outputs of the signal wirings M1 to M3 in the photoelectric conversion circuit unit and series-converts and outputs the signal outputs. RES1 to RES3 are switches for resetting the signal wirings M1 to M3, A1 to A3 are amplifiers for amplifying signals of the signal wirings M1 to M3, CL1 to CL3 are sample holding capacitors for temporarily storing signals amplified by the amplifiers A1 to A3, Sn1 to Sn3 are switches for sample holding, B1 to B3 are buffer amplifiers, Sr1 to Sr3 are switches for series-converting parallel signals, SR2 a shift resister for supplying pulses for series conversion to the switches Sr1 to Sr3, Ab is a buffer amplifier for outputting a series-converted signal.

Then, operations of the photoelectric conversing apparatus shown in FIG. 14 are described below. FIG. 15 is a time chart showing operations of the conventional photoelectric converting apparatus shown in FIG. 14.

The control signal VSC supplies two types of biases to the Vs line, that is, D electrodes of the photoelectric converting devices (S1-1 to S3-3). The D electrodes become Vref(V) when the control signal VSC is set to "Hi" and Vs(V) when the control signal VSC is set to "Lo". The reading power source Vs(V) and refreshing power source Vref(V) are DC power sources.

First, operations in the refresh period are described. All signals of the shift register SR1 are set to "Hi" and the CRES signal of the readout circuit unit 702 is set to "Hi". Thus, all switching TFTs (T1-1 to T3-3) are turned on, the switching devices RES1 to RES3 in the reading circuit 702 are also turned on and G electrodes of all photoelectric converting devices (S1-1 to S3-3) become the GND potential. Moreover, when the control signal VSC is set to "Hi", D electrodes of all photoelectric converting devices (S1-1 to S3-3) become a state biased to the refreshing power source Vref(V) (negative potential). Thereby, all photoelectric converting devices (S1-1 to S3-3) become the refresh mode and refreshing is performed.

Then, a photoelectric converting period is described. When the control signal VSC is changed to the state of "Lo", D electrodes of all photoelectric converting devices (S1-1 to S3-3) become a state biased by the reading power source Vs. Thus, the photoelectric converting devices (S1-1 to S3-3) become the photoelectric converting mode. In this state, all signals of the shift register SR1 are set to "Lo" and the CRES signal of the reading cicuit 702 is set to the state of "Lo". Thereby, all switching TFTs (T1-1 to T3-3) are turned off the switching devices RES1 to RES3 in the reading circuit 702 are also turned off, G electrodes of the photoelectric converting devices (S1-1 to S3-3) are opened in DC. However, potentials of the photoelectric converting devices (S1-1 to S3-3) are kept because they have capacitive element components as components.

At this point of time, electric charges are not generated because light does not enter the photoelectric converting devices (S1-1 to S3-3). That is, no current flows. In this state, when a light source is turned on like a pulse, light is applied to D electrodes ($N^+$ electrodes) of the photoelectric converting devices (S1-1 to S3-3) and the so-called photoelectric current flows. Though the light source is not illustrated in FIG. 14, a fluorescent lamp, LED or halogen lamp is used in the case of a copying machine. In the case of an X-ray radiographing apparatus, an X-ray source is literally used as a light source. In this case, it is allowed to use a scintillator for converting X-rays into visible light. Moreover, photoelectric current flown by light is stored in photoelectric converting devices (S1-1 to S3-3) as electric charges and kept after a light source is turned off.

Then, a reading period is described. The reading operation is performed from the photoelectric converting device (S1-1 to S3-3) at the first line to photoelectric converting devices (S2-1 to S2-3) at the second line and photoelectric converting devices (S3-1 to S3-3) at the third line, in order.

First, a gate pulse is supplied to the gate wirings G1 of the TFTs (T1-1 to T1-3) of a switching device from the SR1 in order to read the photoelectric converting devices (S1-1 to S1-3) at the first line. In this case, a high-level gate pulse is a voltage V (on) supplied from the outside. Thereby, the TFTs (T1-1 to T1-3) are turned on and signal charges stored in the photoelectric converting devices (S1-1 to S1-3) at the first line are transferred to the signal wirings M1 to M3.

A reading capacitive element is added to the signal wirings M1 to M3 though not illustrated in FIG. 14 and the signal charges are transferred to the reading capacitive elements through the TFTs (T1-1 to T1-3). For example, the reading capacitive element to which the signal wiring M1 is the summation of inter-electrode capacitive elements (Cgs) (three capacitive elements) between gates and sources of the TFTs (T1-1 to T3-1) connected to the signal wiring M1. Moreover, signal charges transferred to the signal wirings M1 to M3 are amplified by amplifiers A1 to A3. Then, by turning on a SMPL signal, the signal is transferred to sample holding capacitive elements CL1 to CL3 to turn off the SMPL signal and the capacitive elements CL1 to CL3 are held.

Then, by applying a pulse from the shift register SR2 to the switches Sr1, Sr2 and Sr3, signals held by the sample holding capacitive elements CL1 to CL3 are output from the amplifier Ab in order of the sample holding capacitive elements CL1, CL2, CL3. As a result, photoelectric conversion signals for one line of the photoelectric converting devices (S1-1 to S1-3) are sequentially output.

Read operations of the photoelectric converting devices (S2-1 to S2-3) at the second line and read operations of the photoelectric converging devices (s3-1 to S3-3) at the third line are similarly performed.

When signals of the signal wirings M1 to M3 is sample-held in the sample holding capacitive elements CL1 to CL3 in accordance with the first-line SMPL signal, the signal wirings M1 to M3 are reset to the GND potential in accordance with a CRES signal and thereafter, a gate pulse can be applied to a gate wiring G2. That is, it is possible to transfer signal charges of the photoelectric converting devices (S2-1 to S2-3) at the second line by the shift register SR1 while performing the series converting operation of the signal at the first line by the shift register SR2.

According to the above operations, it is possible to output signal charges of all the photoelectric converting devices (S1-1 to S3-3) from the first line to the third line.

Operations of the X-ray radiographing apparatus described above are operations for obtaining one static image as it were by performing the refresh operation, applying X-rays and performing the read operation. Moreover, to obtain continuous dynamic images, it is only necessary to operate the time chart shown in FIG. 15 repeatedly, a number of times equal to the number of dynamic images to be obtained.

FIG. 16 shows a two-dimensional circuit configuration of a photoelectric converting apparatus using not MIS-type photoelectric converting device but a PIN-type photoelectric converting device. In FIG. 16, only 9 pixels=3×3 pixels are shown similarly to FIG. 14.

In the case of the PIN-type photoelectric converting device, a P layer is constituted. This is not included in the switching device (TFT) shown in FIG. 11. That is, as shown in FIG. 11, it is impossible to simultaneously constitute a photoelectric converting device and a switching device on the same substrate. Therefore, because a constituting method becomes complex compared to the case in FIG. 11, the manufacturing cost may become high.

However, the PIN-type photoelectric converting device has no insulating layer (injection element layer) differently from the MIS-type photoelectric converting device, electrons and holes can move in both directions. Therefore, it is unnecessary to perform the refresh operation described for the MIS-type photoelectric converting device.

FIG. 17 is a time chart showing operations of the conventional photoelectric converting apparatus shown in FIG. 16. As shown in FIGS. 17 and 15, in the case of the PIN-type photoelectric converting device in FIG. 17, there is no refresh operation. By repeatedly operating the read timing, the PIN-type photoelectric converting device may be advantageous compared to the MIS-type photoelectric converting device in speed when obtaining a dynamic image.

However, particularly in the case of a medial radiation radiographing apparatus, a specification is requested in which a radiographing region is as very large area as 40-cm square in order to radiograph a personal chest. In this case, the capacitive element being parasitic on the signal wirings M1 to M3 ranges between 50 and 200 pF though depending on design even if using either one of the MIS-type photoelectric converting device or the PIN-type photoelectric converting device. These parasitic capacitive elements are the capacitive element between top and bottom of a TFT electrode, capacitive element parasitic at the cross portion between driving wiring and signal wiring and capacitive element parasitic between signal wiring and bias wiring (Vs line) of a photoelectric converting device.

However, when radiographing pixels are arranged at a 200 μm pitch, the pixel capacitive element ranges between 1 and 3 pF. If the capacitive element of a signal wiring is 100 pF and a pixel capacitive element is 2 pF, when performing the transfer operation through a TFT, a signal voltage lowers to 2 pF/(2pF+100pF)≅1/50 at the front and rear of the TFT. In this case, because noise components of a rear-stage readout circuit unit to be connected to a signal wiring, for example, the so-called circuit noises such as thermal noises of a resistance and shot noises of a transistor are not zero, there is a problem in that S/N is lowered. This problem occurs when the photoelectric converting device is either the MIS-type or the PIN-type.

Therefore, in this embodiment, an operational amplifier is provided for each signal wiring, and the size of a differential transistor at the initial stage of the operational amplifier is increased for decreasing the circuit noise of the readout circuit unit 702. However, this structure has the problem that the number of operational amplifiers increases and the chip size increases. Moreover, there are problems in that current consumption increases and calorific output increases. Furthermore, problems that a cooling mechanism must be mounted and, thereby, the apparatus becomes more complex are induced.

Furthermore, as one method for solving deterioration of S/N, U.S. Pat. No. 6,600,160B1 discloses a method for inputting a signal potential from a photoelectric converting device to the gate of a TFT and outputting the TFT as a source follower. In this case, because an output signal of the photoelectric converting device is not deteriorated but it is input to a read circuit, it is considered that this is advantageous for S/N.

In this case, however, noises superimposed on a sensor bias wiring, that is, noises by a bias power source are output through the TFT serving as a source follower similarly to the case of signal components. These noises are included in a conventional circuit which does not output noises as the source follower shown in FIG. 14 or FIG. 16. However, because the noises are buried in noises of a rear-stage read circuit, they tend not to become comparatively conspicuous as images.

However, in the case of the apparatus disclosed in U.S. Pat. No. 6,600,160B1, noise components by the bias power source performs scanning in an image pickup circuit unit or sample holding in a reading circuit unit for every line similarly to the case of a signal. Therefore, there is a problem of inducing horizontal-line noises (hereafter referred to as line noises). The line noises have a problem of deteriorating an image quality compared to noises generated at random for every pixel (hereafter referred to as random noises).

Moreover, noises to be superimposed on a sensor bias wiring include noises due to a bias power source and external noises spatially incoming to the bias wiring from the outside. The system disclosed in U.S. Pat. No. 6,600,160B1 is able to read signals of a photoelectric converting device without loss and outputting them to a readout circuit unit but the system includes a problem that it has no resistance against external noises incoming to the photoelectric converting device, particularly the bias wiring.

Furthermore, a PIN-type photodiode is used as the photoelectric converting device disclosed in U.S. Pat. No. 6,600,160B1. Because the PIN-type photodiode does not require the refresh operation necessary for a MIS-type photoelectric converting device, it has less problems that it is difficult to apply the photodiode to dynamic-image photographing related to the refresh operation.

However, because the PIN-type photodiode requires two junctions such as P1 junction and IN junction, it has the problem that dark current increases. Particularly, a P layer is a layer peculiar to a photoelectric converting device and it is completely different from the fabrication process of other TFTs formed on the same substrate. This represents that there is a problem that a laminated structure is formed because it is necessary separately to fabricate a TFT and a photoelectric converting device, and as a result the structure is disadvantageous in yield and cost.

However, when using an MIS-type photoelectric converting device, it is possible to obtain a dynamic image by continuously repeating the read operation as described above. However, by switching the bias power source of the photoelectric converting device, it is necessary to perform the refresh operation and there is a problem that the speed is decreased by the time equivalent to the refresh operation.

Particularly, in the case of a medical image pickup apparatus, the area increases and the number of pixels is inevitably increased. For example, when fabricating an X-ray radiographing apparatus by setting the radiographing region to 40-cm square and the pixel pitch to 200 μm, the number of photoelectric converting devices reaches 4,000,000. To simultaneously refresh these many pixels through a bias wiring as examples shown in FIGS. 14 and 15, it is necessary to apply X-rays by waiting the convergence of voltage fluctuations of GND and power source line of the X-ray radiographing apparatus because the current to be transiently flown at the time of refresh also increases and voltage fluctuations of the GND and power source line increase. That is, a system for simultaneously refresh bias wirings has a problem that it is impossible to achieve a high frame rate as a dynamic image.

Thus, in the case of the prior art for refreshing all photoelectric converting devices once for every operation for reading one frame, dynamic-image photographing is difficult.

SUMMARY OF THE INVENTION

The present invention is made to solve the above problems and its object is to provide a radiation image pickup apparatus capable of improving the S/N ratio while restraining noises, preferably capable of performing stable and high-speed dynamic-image photographing and capable of restraining dark current and its control method.

As a result of enthusiastically repeating study in order to solve the above problems, the present inventor reaches various conformations of the invention shown below.

According to the present invention, it is possible to decrease the distance between a signal wiring and at least either of a bias power source and a reset power source and decrease the number of external noise components through a space or wiring. Therefore, it is possible to decrease the number of noise components such as random noises or line noises. Moreover, because a first field-effect transistor is the source-follower type, it is possible to restrain attenuation of a signal due to a capacitive element being parasitic on a signal wiring. Therefore, it is possible to improve the S/N ratio. Moreover, because it is possible to avoid a circuit configuration for connecting an operational amplifier to each signal wiring, it is possible to decrease current consumption. Furthermore, it is possible to make a medical environment higher than the present one in quality in a future aging society.

Furthermore, it is possible to use a material and design same as those of a readout circuit unit for a bias power source and/or reset power source set in a readout circuit unit. Therefore, it is possible to decrease noises of a bias power source or reset power source by using, for example, an operational amplifier. Also by this point, it is possible to restrain noise components such as random noises and line noises.

Furthermore, when using an MIS-type photoelectric converting device and refreshing (or resetting) converting devices from which an electrical signal is read for each line, it is possible to restrain the voltage fluctuation of GND or power-source line, omit the waiting time for each frame and perform stable and high-speed dynamic-image photographing. Furthermore, when using an MIS-type photoelectric converting device, it is possible to restrain dark current compared to a case of using a PIN-type photoelectric converting device and fabricate a radiation image pickup apparatus at a low cost.

Furthermore, when forming a first field-effect transistor, second field-effect transistor and third field-effect transistor by using amorphous silicon semiconductor as a main material, it is possible to form a converting device and each field-effect transistor on the same substrate. Therefore, it is possible to improve the yield of radiation image pickup apparatuses in fabrication.

DETAILED DESCRIPTION OF THE PREFERRED EMBODIMENTS

Embodiments of the present invention are specifically described below by referring to the accompanying drawings.

Figure 1:
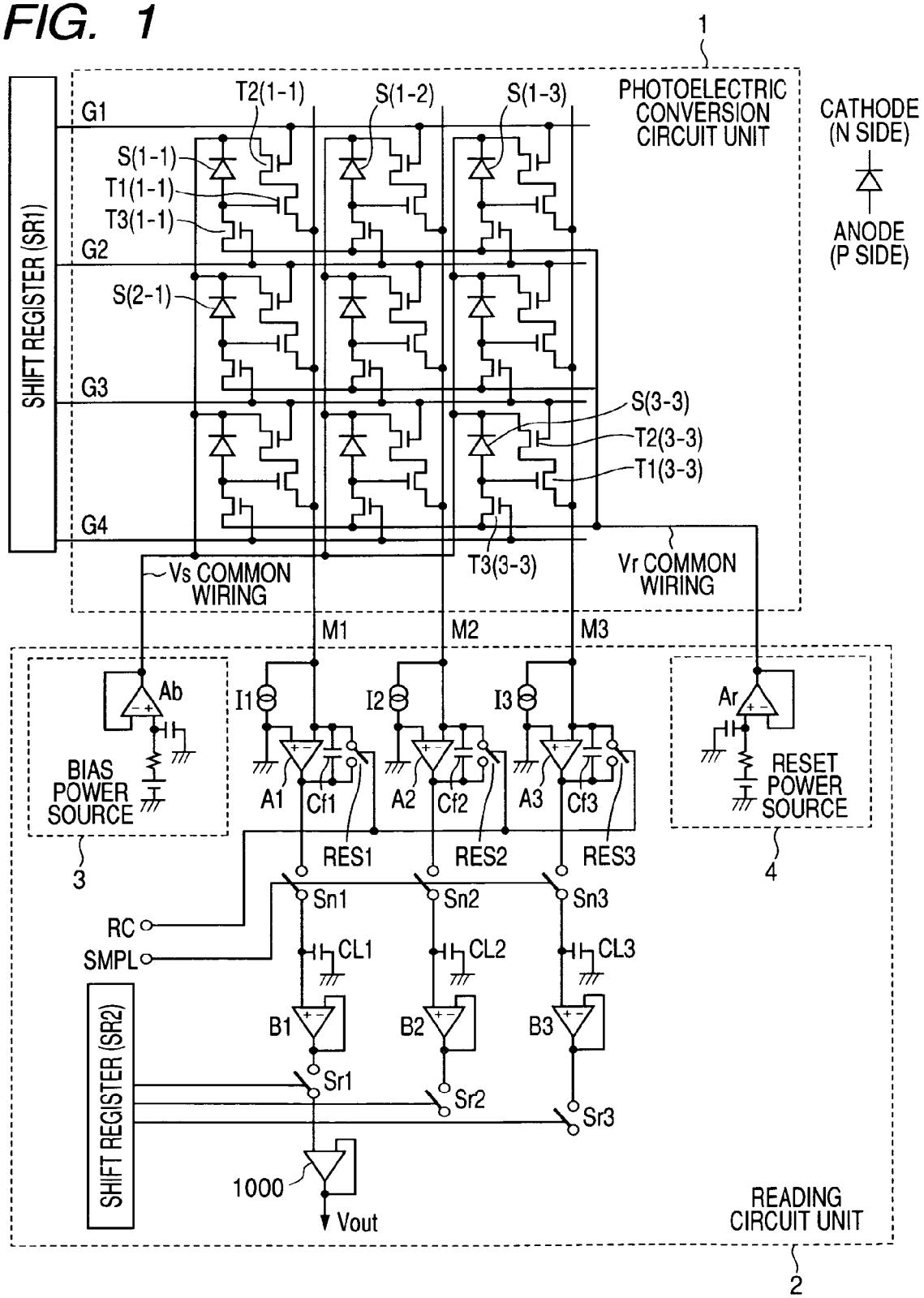
FIG. 1 is an illustration showing a two-dimensional circuit configuration of an X-ray image pickup apparatus (radiation image pickup apparatus) of a first embodiment of the present invention.

First, the first embodiment of the present invention is described below. FIG. 1 is an illustration showing a two-dimensional circuit configuration of the X-ray image pickup apparatus (radiation image pickup apparatus) of the first embodiment of the present invention. However, in FIG. 1, 9 pixels=3×3 pixels are shown in order to simplify the description.

In FIG. 1, S(1-1) to S(3-3) are photoelectric converting devices for respectively converting visible light converted by in which X-rays are converted by a wavelength converting member into electrical signals. In the case of this embodiment, the device is a PIN-type photoelectric converting device. The PIN-type photoelectric converting device shows a diode because of a circuit symbol. T1(1-1) to T1(3-3) are first TFTs in each of which the electrode at the anode side (P side) of a photoelectric converting device is connected to a gate terminal.

T2(1-1) to T2(3-3) are second TFTs respectively set to selectively read an electrical signal of a photoelectric converting device for each line in scanning.

T3(1-1) to T3(3-3) are third TFTs respectively set to reset a photoelectric converting device from which an electrical signal is read.

G1 to G4 are gate wirings for turning on/off the T2(1-1) to T2(3-3) which are second TFTs and T3(1-1) to T3(3-3) which are third TFTs and M1 to M3 are signal wirings. A Vs common wiring is a wiring common to all pixels for supplying a positive bias to electrodes at the cathode sides (N side) of the photoelectric converting devices S(1-1) to S(3-3). Moreover, a Vr common wiring is a wiring common to all pixels for supplying a reset bias to anode electrodes of the photoelectric converting devices S(1-1) to S(3-3).

In the case of this embodiment, the photoelectric converting devices S(1-1) to S(3-3), first TFTs (T1(1-1) to T1(3-3)), second TFTs (T2(1-1) to T2(3-3)), third TFTs (T3(1-1) to T3(3-3)), gate wirings G1 to G3, signal wirings M1 to M3, Vs common wiring and Vr common wiring are included in the photoelectric conversion circuit unit (radiation detecting circuit unit) 1.

Moreover, the shift register SR1 is a drive circuit unit for supplying drive pulse voltage to the gate wiring G1 to G4 and turning on/off the second TFTs (T2(1-1) to T2(3-3) and third TFTs (T3(1-1) to T3(3-3)) in order to read electrical signals of the photoelectric converting devices S(1-l) to S(3-3) from the first TFTs (T1(1-1) to T1(3-3)) for every line.

The readout circuit unit 2 reads parallel output signals from the photoelectric converting device 1 and series-converts and outputs them. A1 to A3 are operational amplifiers in which an inversion terminal (−) is connected to the signal wirings M1 to M3. Capacitive elements Cf1 to Cf3 are connected between the inversion terminal (−) and an output terminal. Moreover, current sources I1 to I3 are connected to the signal wirings M1 to M3. The capacitive elements Cf1 to Cf3 accumulate electrical signals of the photoelectric converting devices S(1-1) to S(3-3) when the second TFTs (T2(1-1) to T2(3-3)) are turned on. REST to RES3 are switches for resetting the capacitive elements Cf1 to Cf3 and are connected in parallel with the capacitive elements Cf1 to Cf3. In FIG. 1, a reset bias is shown by GND. CL1 to CL3 are sample holding capacitive elements for temporarily storing signals accumulated in the capacitive elements Cf1 to Cf3. Moreover, Sn1 to Sn3 are switches for performing sample holding by the sample holding capacitive elements CL1 to CL3, B1 to B3 are buffer amplifiers, Sr1 to Sr3 are switches for series-converting parallel signals, SR2 is a shift register for supplying pulses to Sr1 to Sr3 to perform series conversion and 1,000 is an amplifier for outputting a series-converted signal.

A bias power source 3 for supplying a bias to one-hand electrode of a photoelectric converting device through the Vs common wiring in the photoelectric conversion circuit unit 1 and a reset power source 4 for supplying a reset bias to the other-hand electrode of the photoelectric converting device through the Vr common wiring in the photoelectric conversion circuit unit 1 are further formed on the readout circuit unit 2.

An operational amplifier Ab for outputting a bias voltage is set to the bias power source 3 and an operational amplifier Ar for outputting a reset voltage is set to the reset power source 4. In FIG. 1, a DC power source shown in the dotted-line portion of the bias power source 3 or reset power source 4 is a reference power source for supplying a constant potential, which is a power source constituted by the band gap method. The operational amplifiers Ab and Ar are shown as buffers but it is allowed to apply a magnification according to necessity. Moreover, resistors and capacitors in the bias power source 3 and reset power source 4 constitute a low-pass filter for cutting off the noise component of the high-frequency region of a power source. To minimize a cutoff frequency, it is necessary to increase the capacitive element of a capacitor. When it is impossible to form a capacitive element in the readout circuit unit 2, it is allowed to mount the capacitive element at the outside.

Figure 2:
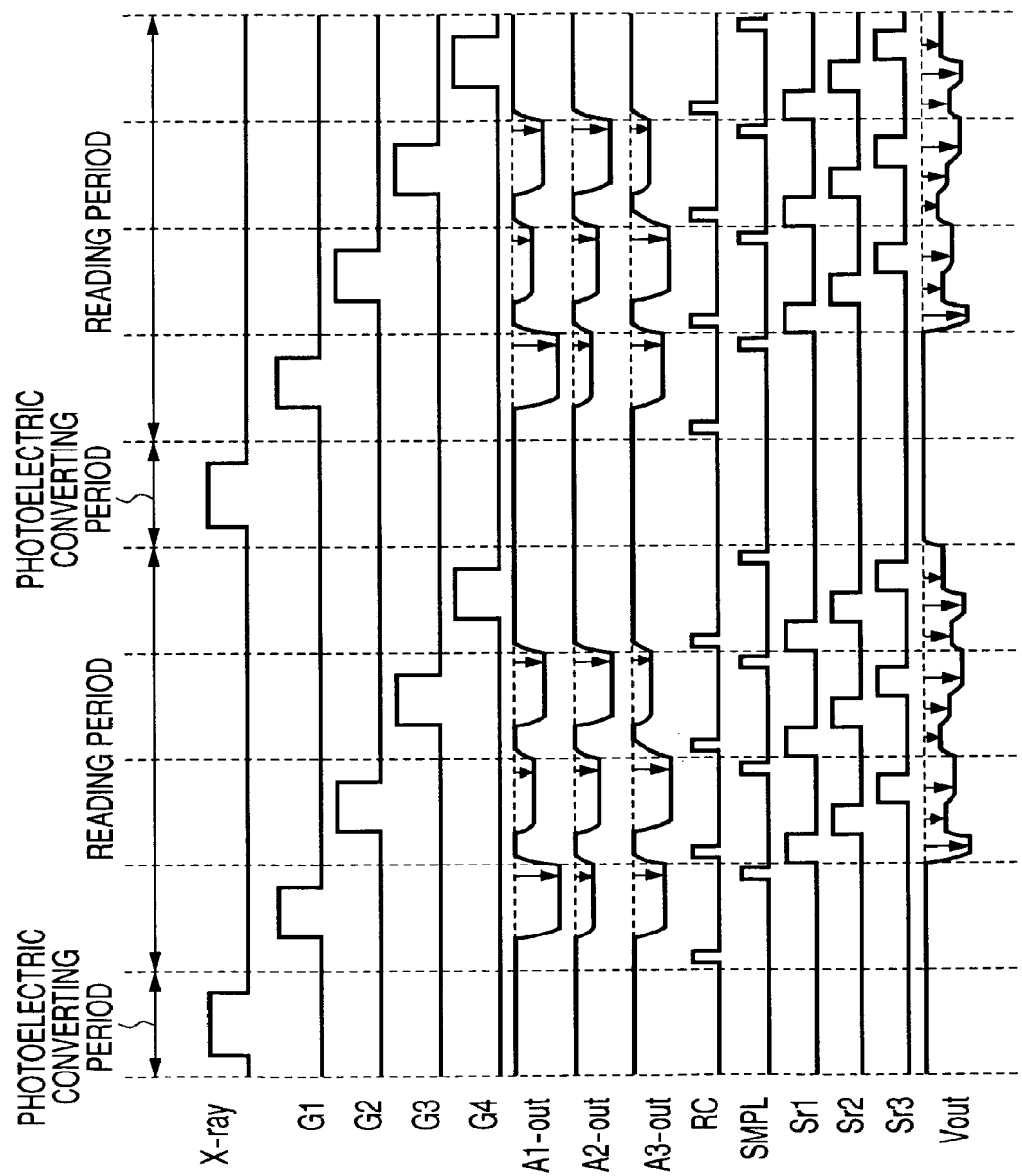
FIG. 2 is a time chart showing operations of the X-ray image pickup apparatus of the first embodiment of the present invention.

Then, operations of the first embodiment constituted as described above are described. FIG. 2 is a time chart for operations of the X-ray image pickup apparatus of the first embodiment of the present invention, which shows operations for two frames. Two operation periods such as the photoelectric converting period and the reading period are shown in the time chart in FIG. 2.

First, the photoelectric converting period is described. Cathode-side electrodes (N electrodes) of all the photoelectric converting devices S(1-1) to S(3-3) are kept in a state biased to a positive potential by a bias power source. Every signal of the shift register SR1 is "Lo" and T2(1-1) to T2(3-3) which are second TFTs and T3(1-1) to T3(3-3) which are third TFTs are turned off. When X-rays come in a pulse in this state, visible light is applied to each photoelectric converting device through a scintillator (not illustrated in FIG. 1) and carriers of electrons and holes are generated in the B1layer of a PIN-type photoelectric converting device. In this case, electrons move to the cathode-side electrode (N electrode), that is, the bias power source side by a sensor bias Vs. However, holes move to the first TFT side in the opposite direction and mainly stored in photoelectric converting devices. This electric charge is held even after stopping application of X-rays.

Then, the reading period is described. The read operation is performed in order of the first-line photoelectric converting devices (S1-1 to S1-3), second-line photoelectric converting devices (S2-1 to S2-3) and third-line photoelectric converting devices (S3-1 to S3-3).

First, to read the first-line photoelectric converting devices (S1-1 to S1-3), a gate pulse is supplied to the gate wiring G1 from the shift register SR1 to turn on the first-line second TFTs (T2(1-1) to T2(1-3)). Thereby, drain current flows through the first-line first TFTs (T1(1-1) to T1(1-3)) to whose gate terminals potentials corresponding to signal charges of the first-line photoelectric converting devices (S1-1 to S1-3) are applied and the current enters the capacitive elements Cf1 to Cf3 connected to the initial-stage operational amplifiers A1 to A3 of the readout circuit unit 2 and integrated.

Potentials of output terminals of the operational amplifiers A1 to A3 are changed to negative side as shown in FIG. 2 in accordance with the number of signals of photoelectric converting devices. Because the first-line second TFfs (T2(1-1) to T2(1-3)) are simultaneously turned on, outputs of the operational amplifiers A1 to A3 are simultaneously changed. That is, they are parallel outputs. Under this state, by turning on a SMPL signal, output signals of the operational amplifiers A1 to A3 are transferred to the sample holding capacitive elements CL1 to CL3. When turning off the SMPL signal, the output signals are once held. Then, when applying pulses from the shift register SR2 in order of the switches Sr1, Sr2 and Sr3, signals held in order of CL1, CL2 and CL3 are output through the amplifier 1000. As a result, photoelectric conversion signals of the first-line photoelectric converting devices (S1-1 to S1-3) are sequentially series-converted and output. Read operations of the second-line photoelectric converting devices (S2-1 to S2-3) and read operations of the third-line photoelectric converting devices (S3-1 to S3-3) are similarly performed.

When signals of the operational amplifiers A1 to A3 are sample-held by the sample holding capacitive elements CL1 to CL3 in accordance with a change of the SMPL signal in first-line reading, signals of the first-line photoelectric converting devices (S1-1 to S1-3) are output from the photoelectric conversion circuit unit 1. Therefore, while the signals are series-converted by the switches Sr1 to Sr3 in the readout circuit unit 2 to be outputted, it is possible to reset the first-line photoelectric converting devices (S1-1 to S1-3) and the capacitive elements Cf1 to Cf3 in the photoelectric conversion circuit unit 1.

Therefore, in the case of this embodiment, the first-line photoelectric converting devices (S1-1 to S1-3) are reset simultaneously when the second-line photoelectric converting devices (S2-1 to S2-3) are read. To realize the above mentioned, the gate wiring for controlling the first-line third TFTs (T3(1-1) to T3(1-3)) and the gate wiring for controlling the second-line second TFTs (T2(2-1) to T2(2-3)) are shared by the same gate wiring G2. That is, in the case of this embodiment, reading operation of the n-th-line photoelectric converting devices and resetting operation of the (n−1)-th-line photoelectric converting devices are performed at the same time.

Then, by repeating this photoelectric converting period and reading period, it is possible to obtain continuous dynamic images.

According to the first embodiment, because the bias power source 3 and reset power source 4 are arranged in the readout circuit unit 2, it is possible to shorten the Vs common wiring and Vr common wiring similarly to a signal wiring. Therefore, it is possible to decrease external noises incoming through space. External noises are noises mainly incoming through space. For example, an X-ray source for generating X-rays uses a high-voltage power source. Noises from the high-voltage power source, noises from an ignition coil of an automobile, noises from other radio-wave units and noises due to lightning correspond to the external noises.

In general, when the second TFT is turned on/off for each line by a shift register (SR1), noises are added to the Vs common wiring for an unknown reason or the reading operation of a photoelectric converting device is performed when transferring signals for each line to CL1 to CL3 in a readout circuit unit in accordance with the SMPL signal, noises are easily mixed in an output signal. The noises become a crossbar-like pattern on a screen, which results in extreme deterioration of an image quality. These crossbar-like noises are referred to as "horizontal-line noises" or simply as "line noises". Moreover, when the third TFTs are reset for each line by the shift register (SR1) and noises are added to the Vr common wiring for an unknown reason, noises are easily mixed in an output signal. Also in this case, horizontal line noises are generated.

Conventionally, a readout circuit unit is mounted on a position nearby a photoelectric conversion circuit unit. This is because a signal of a photoelectric converting device is transferred into the readout circuit unit through a signal wiring and therefore, it is effective for restraint of external noises to minimize the length of the wiring.

Moreover, in the case of this embodiment, because the operational amplifiers Ab and Ar constituting the bias power source 3 and reset power source 4 are set in the readout circuit unit 2, it is possible not only to minimize lengths of the Vs common wiring and Vr common wiring but also to lower an output impedance. Therefore, external noises are not easily mixed.

Furthermore, because the operational amplifiers Ab and Ar are set in the readout circuit unit 2, it is possible to design them as low-noise amplifiers. That is, it is possible to optimize finite noises of an operational amplifier, that is, Johnson noises of individual component constituting an operational amplifier, white noises such as shot noises and flicker noises (1/f noises) at the design stage.

A readout circuit unit generally uses an integrated circuit (IC) using silicon as a main material. For example, it is possible to design an operational amplifier or analog switch device by using a MOS transistor or bipolar transistor and fabricate a readout circuit unit as an IC chip. By applying the same design technique to the bias power source 3 and reset power source 4, it is possible to fabricate them in the readout circuit unit 2 as shown in FIG. 1.

Moreover, in the case of this embodiment, the bias power source 3 and reset power source 4 are formed in the readout circuit unit 2. However, it is also allowed to form only either of them in the unit 2.

Furthermore, in the case of this embodiment, a photoelectric conversion period is used in which X-rays are applied like a pulse. However, it is also possible to obtain continuous dynamic images by continuously applying X-rays and repeating only a reading period. In this case, because the accumulation period of photoelectric converting devices is shifted for each line, uncomfortable feeling may occur when observing an image.

Furthermore, in the case of this embodiment, a positive bias is applied to the cathode side (P side) of a PIN-type photoelectric converting device from a bias power source through the Vs common wiring. However, it is also allowed to apply a negative bias from the bias power source by using the anode side (N side) as the Vs common wiring. In this case, in the case of the timing chart in FIG. 2, polarities of A1-out, A2-out, A3-out and Vout are reversed.

Second Embodiment

Figure 3:
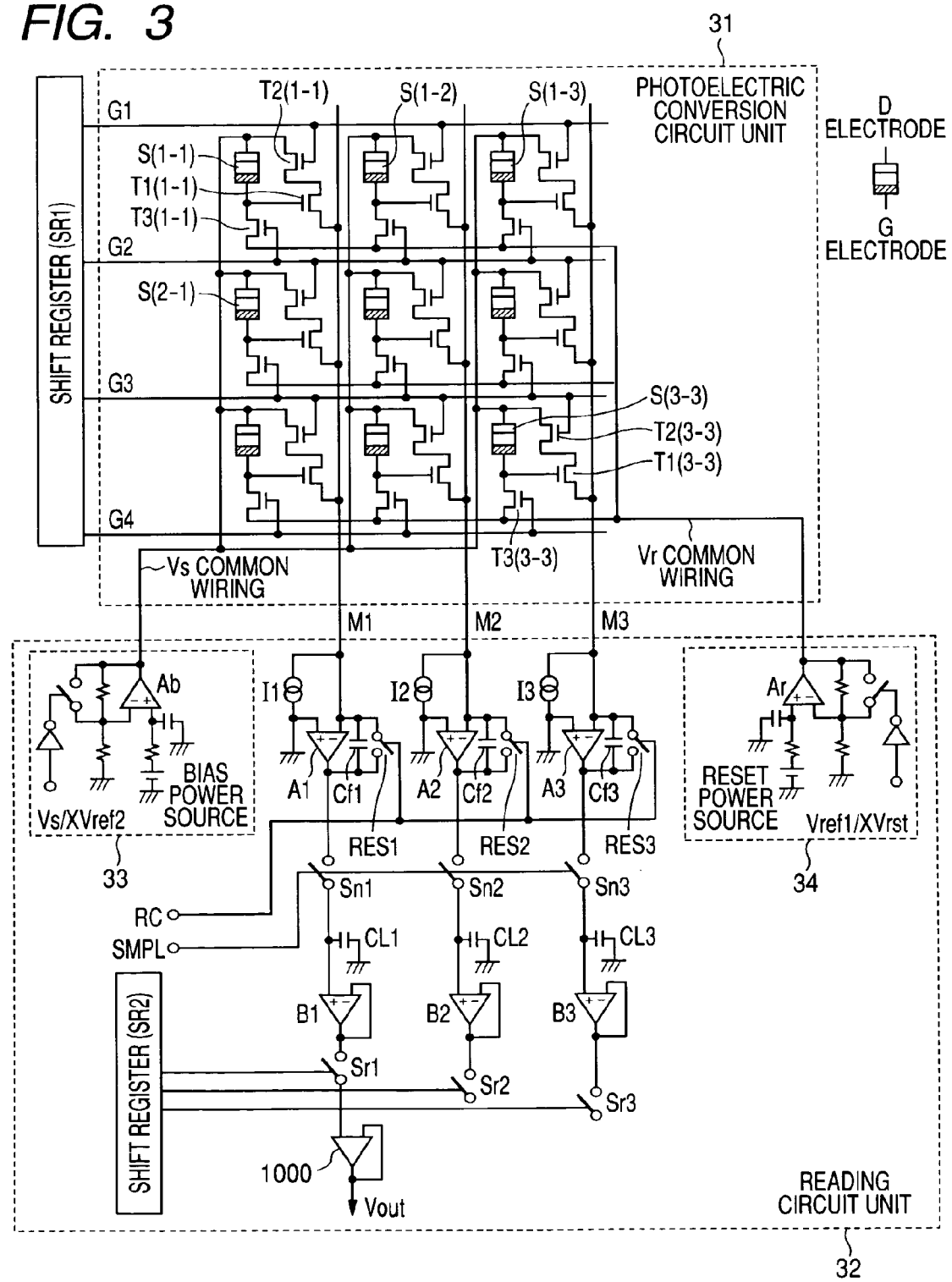
FIG. 3 is an illustration showing a two-dimensional circuit configuration of an X-ray image pickup apparatus (radiation image pickup apparatus) of a second embodiment of the present invention.

Then, second embodiment of the present invention is described below. FIG. 3 is an illustration showing a two-dimensional circuit configuration of the X-ray image pickup apparatus (radiation image pickup apparatus) according to the second embodiment of the present invention. FIG. 3, shows 9 pixels=3×3 pixels in order to simplify description.

In FIG. 3, S(1-1) to S(3-3) are photoelectric converting devices for converting visible light in which X-rays are converted by a wavelength converting member into electrical signals and are MIS-type photoelectric converting devices in the case of this embodiment. T1(1-1) to T1(3-3) are first TFTs in which the G electrode of each photoelectric converting device is connected to a gate terminal. T2(1-1) to T2(3-3) are second TFTs set to selectively read an electrical signal of a photoelectric converting device for each line in scanning. T3(1-1) to T3(3-3) are third TFTs set to refresh or reset a photoelectric converting device from which an electrical signal is read.

G1 to G4 are gate wirings for turning on/off T2(1-1) to T2(3-3) which are the second TFTs and T3(1-1) to T3(3-3) which are the third TFfs and M1 to M3 are signal wirings. A Vs common wiring is a wiring common to all pixels for supplying a sensor bias (Vs) or second refresh bias (Vref2) to D electrodes of the photoelectric converting devices S(1-1) to S(3-3). Moreover, a Vr common wiring is a wiring common to all pixels for supplying a reset bias (Vrst) or first refresh bias (Vref1) to G electrodes of the photoelectric converting devices S(1-1) to S(3-3).

Electrodes at blackened sides of the photoelectric converting devices S(1-1) to S(3-3) are G electrodes and the opposite sides are D electrodes. Though the D electrodes are shared with a part of the Vs common wiring, thin N+ layers are used as the D electrodes in order to make light incoming. In the case of this embodiment, photoelectric converting devices S(1-1) to S(3-3), first TFTs (T1(1-1) to T1(3-3)), second TFTs (T2(1-1) to T2(3-3)), third TFTs (T3(1-1) to T3(3-3)), gate wirings G1 to G3, signal wirings M1 to M3, Vs common wiring and Vr common wiring are included in a photoelectric conversion circuit unit (radiation detecting circuit unit) 31.

Moreover, the shift register SR1 is a drive circuit unit for turning on/off the second TFTs (T2(1-1) to T2(3-3)) and third TFTs (T3(1-1) to T3(3-3)) in order to apply a driving pulse voltage to the gate wirings G1 to G4 and read electrical signals of the photoelectric converting devices S(1-1) to S(3-3) from the first TFTs (T1(1-1) to T1(3-3)) for each line.

A readout circuit unit 32 reads a parallel output signal from the photoelectric circuit unit 31 and series-converts and outputs it. A1 to A3 are operational amplifiers whose inversion terminals (−) are connected to the signal wirings M1 to M3. Capacitive elements Cf1 to Cf3 are connected between the inversion terminals (−) and output terminals. Moreover, current sources I1 to I3 are connected to the signal wirings M1 to M3. The capacitive elements Cf1 to Cf3 accumulate electrical signals of the photoelectric converting devices S(1-1) to S(3-3) when the second TFTs (T2(1-1) to T2(3-3)) are turned on. RES1 to RES3 are switches for resetting the capacitive elements Cf1 to Cf3 and are connected in parallel with the capacitive elements Cf1 to Cf3. In FIG. 3, a reset bias is shown by GND. CL1 to CL3 are sample holding capacitive elements for temporarily storing signals accumulated in the capacitive elements Cf1 to Cf3. Moreover, Sn1 to Sn3 are switches for performing sample holding by the sample holding capacitive elements CL1 to CL3, B1 to B3 are buffer amplifiers, Sr1 to Sr3 are switches for series-converting parallel signals, SR2 is a shift register for supplying a pulse for series conversion to Sr1 to Sr3 and 1000 is an amplifier for outputting a series-converted signal.

A bias power source 33 for supplying a sensor bias (Vs) or refresh bias (Vref2) to the D electrode of a photoelectric converting device through the Vs common wiring in the photoelectric conversion circuit unit 31 and a reset power source 34 for supplying a reset bias (Vrst) or refresh bias (Vref1) to the other-hand G electrode of the photoelectric converting device through the Vr common wiring in the photoelectric conversion circuit unit 1 are further formed on the readout circuit unit 32.

The bias power source 33 is constituted so as to be able to switch a bias to be supplied to the D electrode of the photoelectric converting device through the Vs common wiring in the photoelectric conversion circuit unit 31 to the sensor bias (Vs) or refresh bias (Vref2) in accordance with a Vs/XVref2 control signal. When the Vs/XVref2 control signal is set to "Hi", the bias power source 33 supplies Vs and when the signal is set to "Lo", it supplies Vref2. In the case of this embodiment, Vs is higher than Vref2.

Moreover, the reset power source 34 is constituted so as to be able to switch a bias to be supplied to the G electrode of a photoelectric converting device to the reset bias (Vrst) or refresh bias (Vref1) in accordance with a Vref1/XVrst control signal through the Vr common wiring in the photoelectric conversion circuit unit 31. When the Vref1/XVrst control signal is set to "Hi", the power source 34 supplies the Vref1 and when the signal is set to "Lo", it supplies the Vrst. In the case of this embodiment, Vref1 is higher than Vrst.

Moreover, in the case of this embodiment, it is possible to select a method for simultaneously perform refresh operations of MIS-type photoelectric converting devices through the Vs common wiring or a method for performing the refresh operations for each line through the Vr common wiring. For example, it is possible to fabricate a radiation image pickup apparatus using the former as a static-image photographing mode and the latter as a dynamic-image photographing mode.

Figure 4:
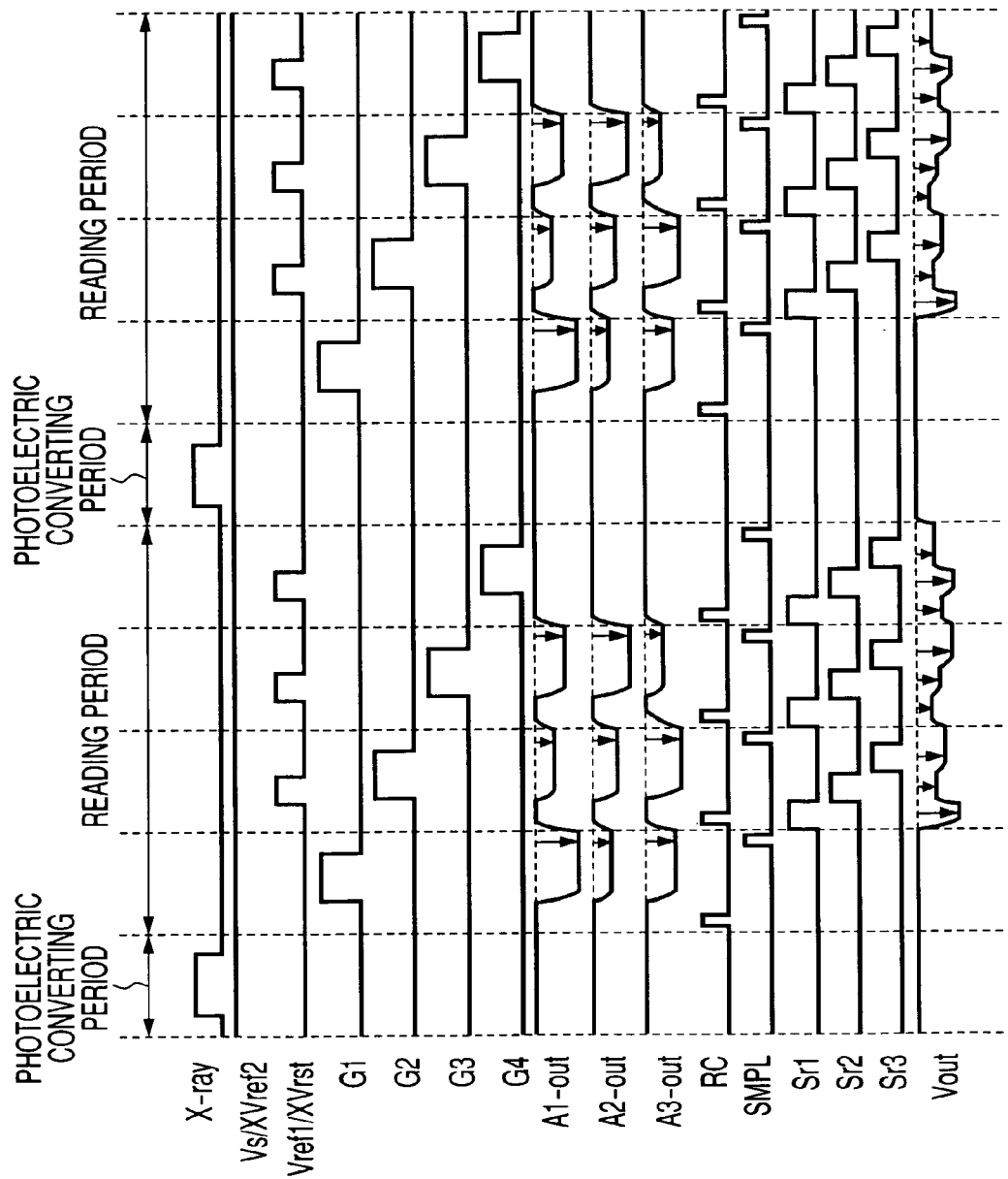
FIG. 4 is a time chart showing operations of the X-ray image pickup apparatus of the second embodiment of the present invention.

Then, operations of the second embodiment constituted as described above are described. FIG. 4 is a time chart for operations of the X-ray image pickup apparatus of the second embodiment of the present invention, which shows operations for two frames. The time chart in FIG. 4 shows two operation periods such as a photoelectric converting period and a reading period.

First, the photoelectric converting period is described. D electrodes of all photoelectric converting devices S(1-1) to S(3-3) are kept in a state biased to the reading power source Vs (positive potential). All signals of the shift register SR1 are set to "Lo" and the T2(1-1) to T2(3-3) which are second TFTs and T3(1-1) to T3(3-3) which are third TFTs are turned off. Under this state, when X rays are irradiated in pulses, visible light is applied to the D electrode (N+ electrode) of each photoelectric converting device through a scintillator and carriers of electrons and holes are generated in the i layer of each photoelectric converting device. In this case, electrons move to the D electrode in accordance with the sensor bias Vs but holes are stored on the interface between the i layer and a insulating layer in the photoelectric converting device and they are held even after application of X rays is stopped.

Then, a reading period is described below. The reading operation is performed in order of the first-line photoelectric converting devices (S1-1 t S1-3), second-line photoelectric converting devices (S2-1 to S2-3) and third-line photoelectric converting devices (S3-1 to S3-3).

First, to read the first-line photoelectric converting devices (S1-1 to S1-3), a gate pulse is supplied from the shift register SR1 to the gate wiring G1 to turn on the first-line second TFTs (T2(1-1) to T2(1-3)). Thereby, drain current flows through the first-line first TFTs (T1(1-1) to T1(1-3) to whose are applied gate terminals potentials corresponding to signal charges of the first-line photoelectric converting devices (S1-1 to S1-3) and the current also enters the capacitive elements Cf1 to Cf3 connected to the operational amplifiers A1 to A3 at the initial stage of the readout circuit unit 2 and integrated.

Potentials of output terminals of the operational amplifiers A1 to A3 are changed to the negative side in accordance with the number of signals of a photoelectric converting device as shown in FIG. 4. Because the first-line second TFTs (T2(1-1) to T2(1-3)) are simultaneously turned on, outputs of the operational amplifiers A1 to A3 are simultaneously changed. That is, they are parallel outputs. Under this state, by turning on the SMPL signal, output signals of the operational amplifiers A1 to A3 are transferred to the sample holding capacitive elements CL1 to CL3. When turning off the SMPL signal, the output signals are temporarily held. Then, when applying a pulse from the shift register SR2 in order of the switches Sr1, Sr2 and Sr3, the held signals are output through the amplifier 1000 in order of CL1, CL2 and CL3. As a result, photoelectric conversion signals of the first-line photoelectric converting devices (S1-1 to S1-3) are sequentially series-converted and output. Read operations of the second-line photoelectric converting devices (S2-1 to S2-3) and those of the third-line photoelectric converting devices (S3-1 to S3-3) are similarly performed.

When sample-holding signals of the operational amplifiers A1 to A3 in the sample holding capacitive elements CL1 to CL3 in accordance with a change of the SMPL signal in first-line reading, signals of the first-line photoelectric converting devices (S1-1 to S1-3) are output from the photoelectric conversion circuit unit 31. Therefore, while the signals are series-converted and output by the switches Sr1 to Sr3 in the readout circuit unit 32, it is possible to refresh and reset the first-line photoelectric converting devices (S1-1 to S1-3) in the photoelectric conversion circuit unit 31 and reset the capacitive elements Cf1 to Cf3.

Therefore, in the case of this embodiment, refresh operation of the first-line photoelectric converting devices (S1-1 to S1-3) is simultaneously performed with the read operation of the second-line photoelectric converting devices (S2-1 to S2-3). To realize the above described, the gate wiring for controlling the first-line third TFTs (T3(1-1) to T3(1-3)) and the gate wiring for controlling the second-line second TFTs (T2(2-1) to T2(2-3)) are shared by the same gate wiring G2.

While the gate wiring G2 is turned on, the Vref1/XVrst control signal becomes "Hi", thereby the Vr common wiring is biased to Vref1 and the first-line photoelectric converting devices (S1-1 to S1-3) are refreshed. Thereafter, while the gate wiring G2 is turned on, the Vref1/XVrst control signal becomes "Lo" and thereby the Vr common wiring is biased to the reset bias Vrst and G electrodes of the first-line photoelectric converting devices (S1-1 to S1-3) are reset by the reset bias Vrst. While the gate wiring G2 is turned on, the second-line second TFTs (T2(2-1) to T2(2-3)) are turned on at the same time and potentials corresponding to signal charges of the second-line photoelectric converting devices (S2-1 to S2-3) are read. Thus, in the case of this embodiment, the read operation of the n-th-line photoelectric converting device and the refresh operation and the reset operation of the (n−1)-th-line photoelectric converting device are simultaneously performed.

Then, by performing the above operations, it is possible to output signal charges of all photoelectric converting devices S(1-1) to S(3-3) from the first line to the third line. That is, by repeating the photoelectric converting period and the reading period, it is possible to obtain continuous dynamic images.

According to the second embodiment, because the bias power source 33 and reset power source 34 are set in the readout circuit unit 32 similarly to the case of the first embodiment, it is possible to shorten the Vs common wiring and Vr common wiring similarly to a signal wiring. Therefore, it is possible to minimize external noises incoming through a space. Moreover, similarly to the case of the first embodiment, it is possible to lower output impedance and thereby, external noises are not easily mixed. Furthermore, because the operational amplifiers Ab and Ar are set in the readout circuit unit 32 similarly to the case of the first embodiment, it is possible to design them as low-noise amplifiers.

Furthermore, in the case of this embodiment, all photoelectric converting devices not simultaneously refreshed but they are refreshed for each line. Therefore, it is possible to decrease fluctuations of GND potential and power source potential due to a dark current component at the time of refresh and increase the frame frequency of a dynamic image. By refreshing a photoelectric converting device through the Vs common wiring common to all photoelectric converting devices, it is indispensable to set one-time refresh period for one frame to obtain a dynamic image. This decreases a frame frequency particularly when obtaining a dynamic image. That is, a problem occurs that an operation speed becomes low. Particularly, in the case of a medical X-ray image pickup apparatus for radiographing the chest region of a human body, simultaneously refreshing most pixels causes the following: the current to be flown at the time of refresh is increased, voltage fluctuations of GND and power source line are increased, immediately reading an image is not stabilized and a preferable image cannot be obtained. However, to perform the refresh operation by turning on the third TFTs (T3(1-1) to T3(3-3)) through the Vr common wiring like the case of this embodiment, it is possible to perform the refresh operation for each line. Therefore, the number of pixels to be refreshed at the same time decreases and it is possible to minimize the current to be flown at the time of refresh.

Moreover, in the case of this embodiment, the bias power source 33 and reset power source 34 are formed in the readout circuit unit 32. However, it is also allowed to form only one or the other of them.

Third embodiment

Figure 5:
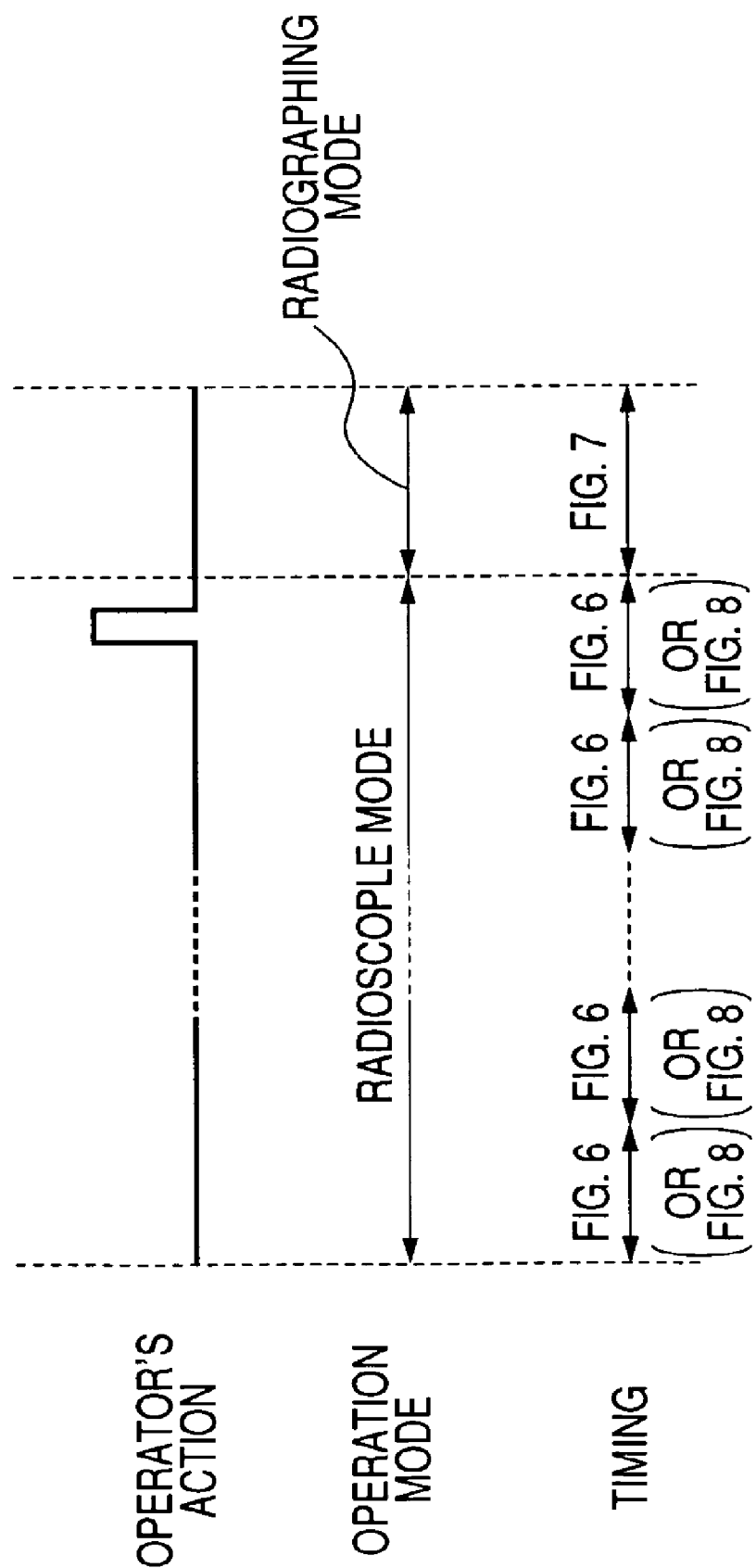
FIG. 5 is an illustration showing a photographing sequence of a X-ray image pickup apparatus of a third embodiment of the present invention.
Figure 6:
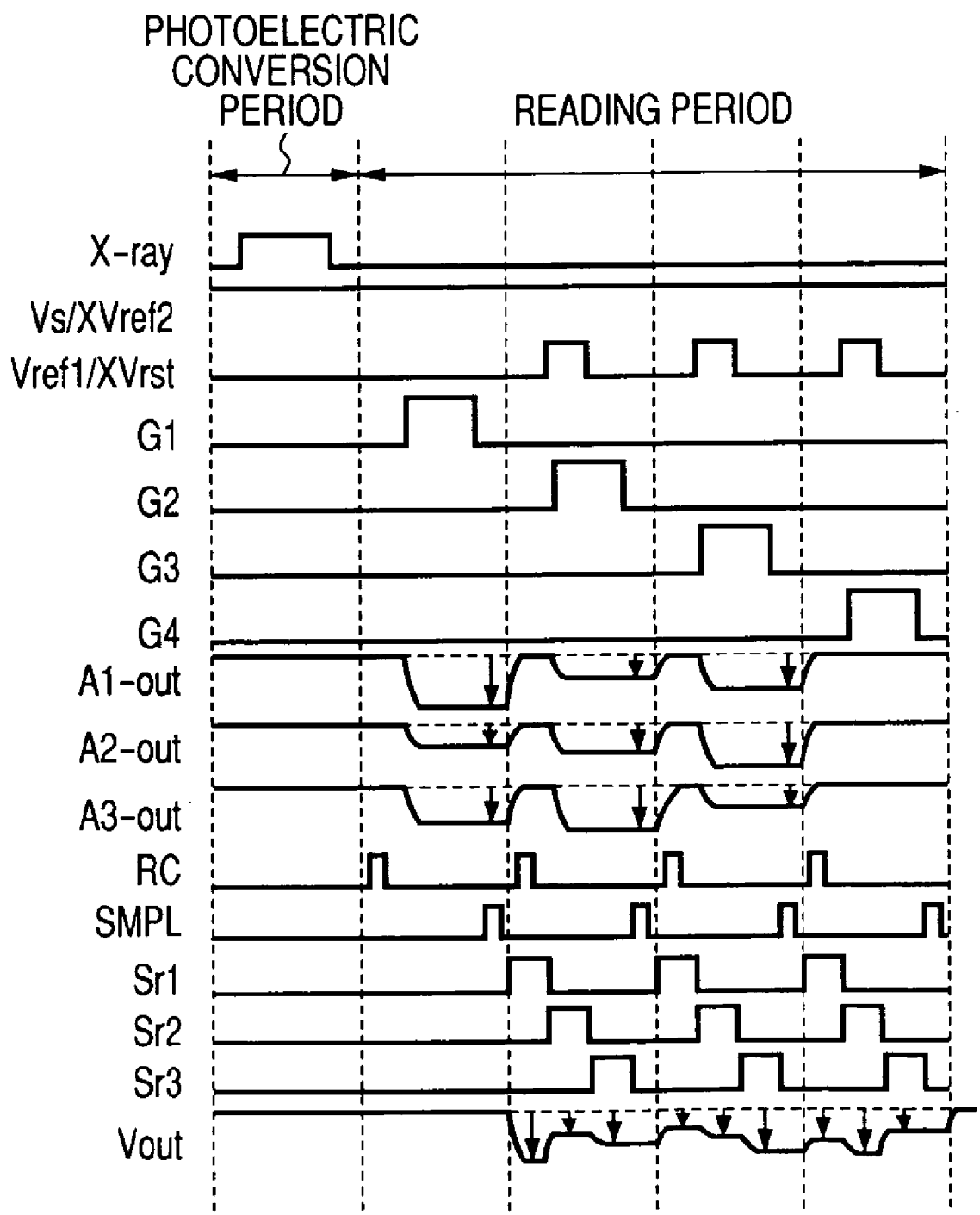
FIG. 6 is a time chart showing operations of an X-ray image pickup apparatus in the radioscopic mode (dynamic image mode)
Figure 7:
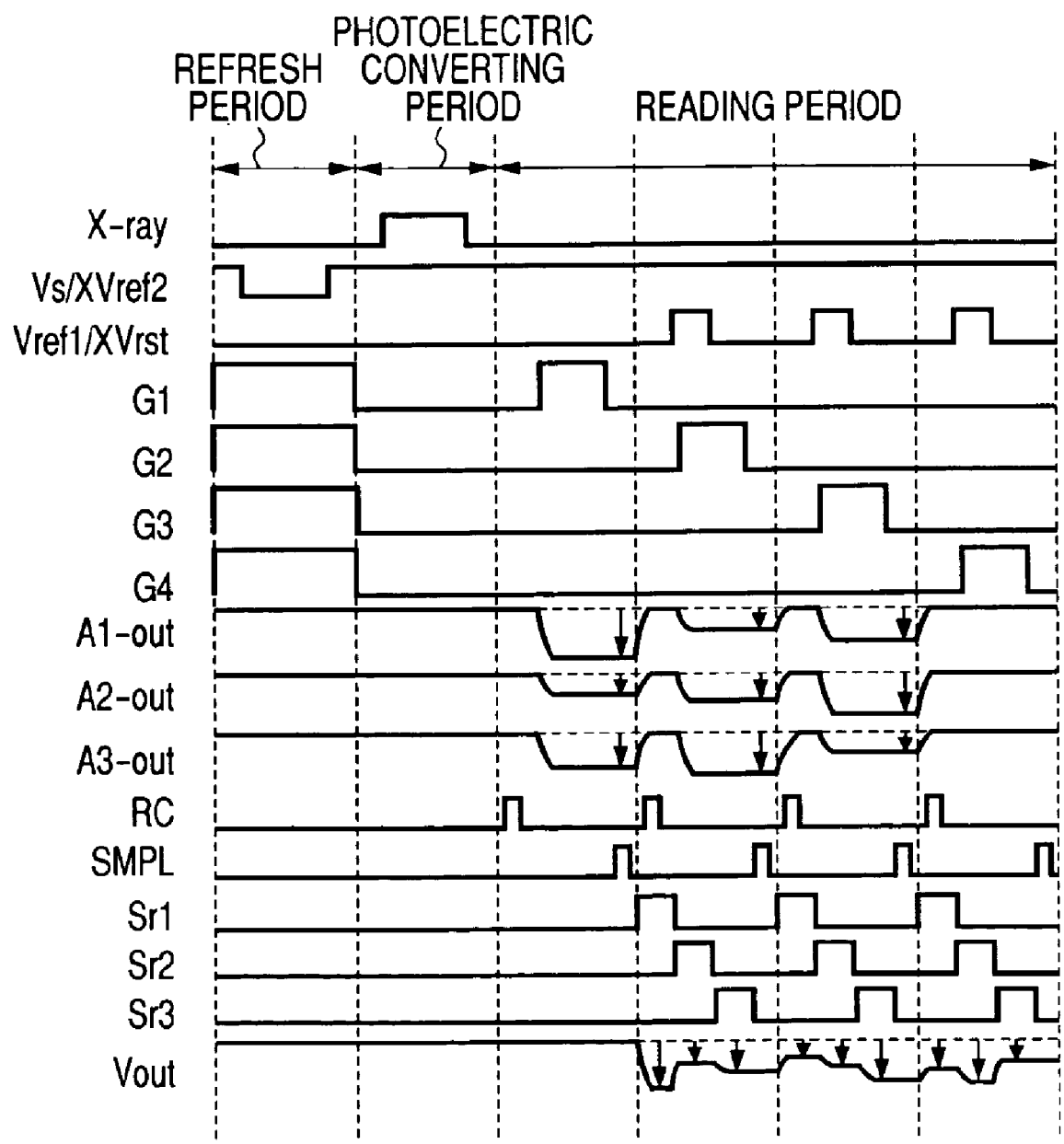
FIG. 7 is a time chart showing operations of an X-ray image pickup apparatus in the radiographing mode (static image mode)

Now, the third embodiment of the present invention is described below. In the case of the third embodiment, the X-ray image pickup apparatus of the second embodiment is changed from the radioscopic mode (dynamic image mode) to the radiographing mode (static image mode) in accordance with a request of an operator for radiographing a static image. FIG. 5 is an illustration showing a radiographing sequence of the X-ray image pickup apparatus of the third embodiment of the present invention. FIG. 6 is a time chart showing operations of an X-ray image pickup apparatus in the radioscopic mode (dynamic image mode) and FIG. 7 is a time chart showing operations of an X-ray image pickup apparatus in the radiographing mode (static image mode).

Figure 8:
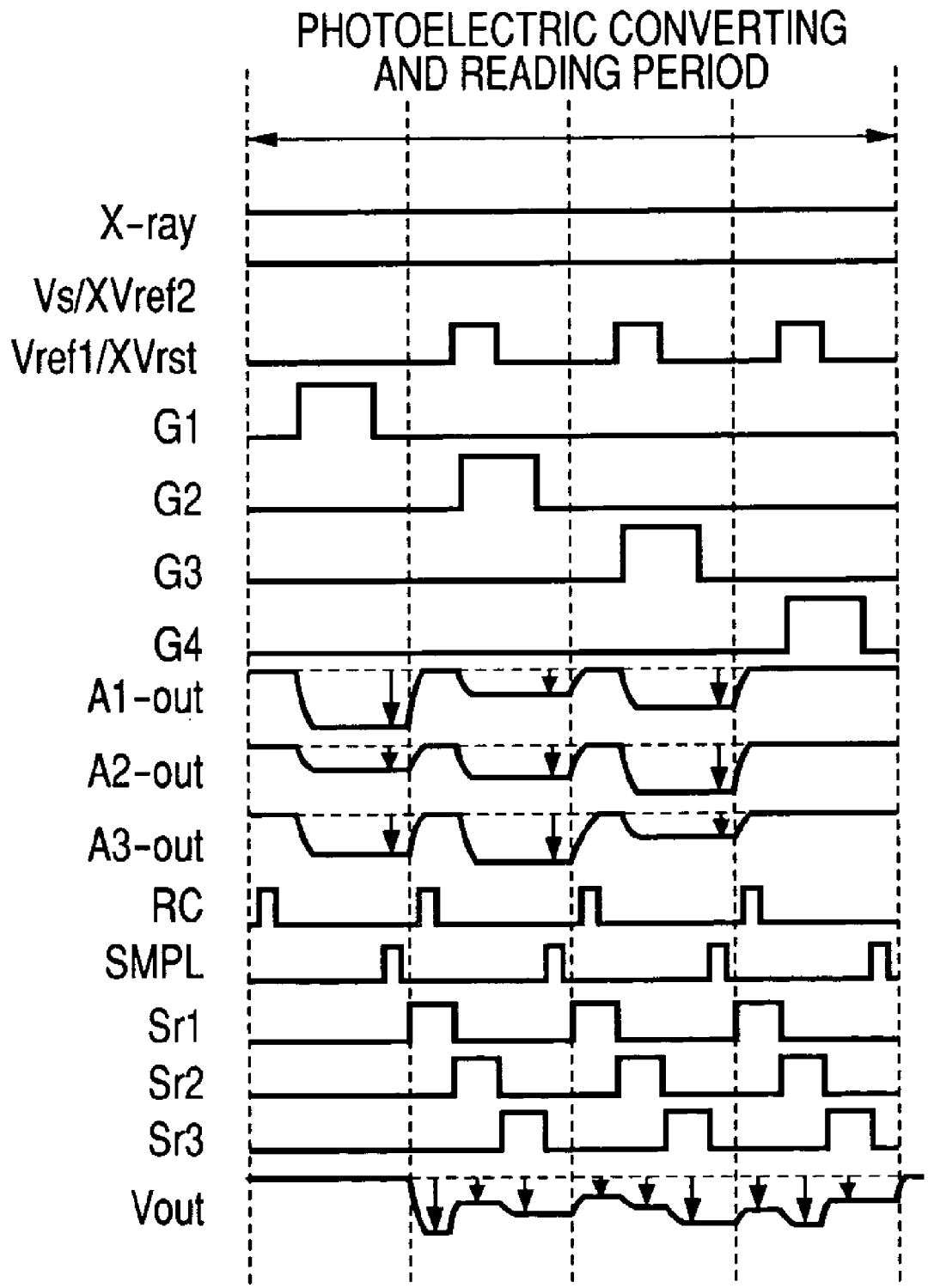
FIG. 8 is a time chart showing operations of an X-ray image pickup apparatus in the radioscopic mode when continuously applying X-rays.

In the radioscopic mode, the timing operation shown in FIG. 6 is repeated. In the period of the radioscopic mode, an operator monitors the radioscopic image of a patient in order to decide the position and angle of an object (patient) for radiographing a static image. Moreover, in general, X-ray dosage during this period is slightly more weakly applied. Furthermore, when the position and angle of the object (patient) are decided, the operator supplies an exposure request signal (radiographing request) to the X-ray image pickup apparatus as an intention signal for radiographing a static image. When the X-ray image pickup apparatus receives the exposure request signal, it transfers the operation mode of the signal from the radioscopic mode to the radiographing mode. In the radiographing mode, the timing operation shown in FIG. 8 is performed.

A combination (flow) of the radioscopic mode and the radiographing mode is not restricted to the mode including the radiographing mode only once shown in FIG. 5. For example, it is allowed to repeat modes a plurality of times like the radioscopic mode, radiographing mode, radioscopic mode, radiographing mode, . . . in accordance with the structural outline of an object to be radiographed.

Moreover, it is allowed to apply X-rays not like a pulse but continuously in the radioscopic mode (dynamic image mode). FIG. 8 shows a time chart for operations of an X-ray image pickup apparatus in the radioscopic mode when continuously applying X-rays.

When continuously applying X-rays, it is possible to bring a reading period and a photoelectric converting period into a single period (photoelectric converting and reading period). Therefore, there is an advantage that it is possible to raise the operation frequency in the radioscopic mode. Moreover, there is an advantage that it is possible to reduce a load to an X-ray generation source because X-rays are not made to come in like a pulse.

When applying the X-ray image pickup apparatus of the second embodiment to a radioscopic apparatus, the first refresh bias (Vref1) is supplied in the radioscopic mode through the third TFTs (T3(1-1) to T3(3-3)) and the position and angle of an object are decided in accordance with radioscopic radiographing. When changing to the static image radiographing mode, the second refresh bias (Vref2) is supplied from the Vs common wiring. Because the refresh from the Vs common wiring is simultaneously applied to all pixels, fluctuations of the GND potential after the refresh operation and the reference potential of a system are increased and thereby, the read operation cannot be performed unless waiting the potential fluctuation. Therefore, it cannot be always said that the refresh is suitable for dynamic image radiographing (radioscopy).

However, on the other hand, because a TFT required for a conventional apparatus is not present between the bias power source 33 and the photoelectric converting devices S(1-1) to S(3-3), it is possible to increase the potential difference between the Vs common wiring and the second refresh bias (Vref2). Therefore, there is an advantage that it is possible to set a saturation charge to a large value. That is, it is more preferable that a high S/N is obtained for static image radiographing for obtaining a diagnostic image and refresh is performed from the common wiring Vs side by the second refresh bias (Vref2).

Fourth Embodiment

Figure 9:
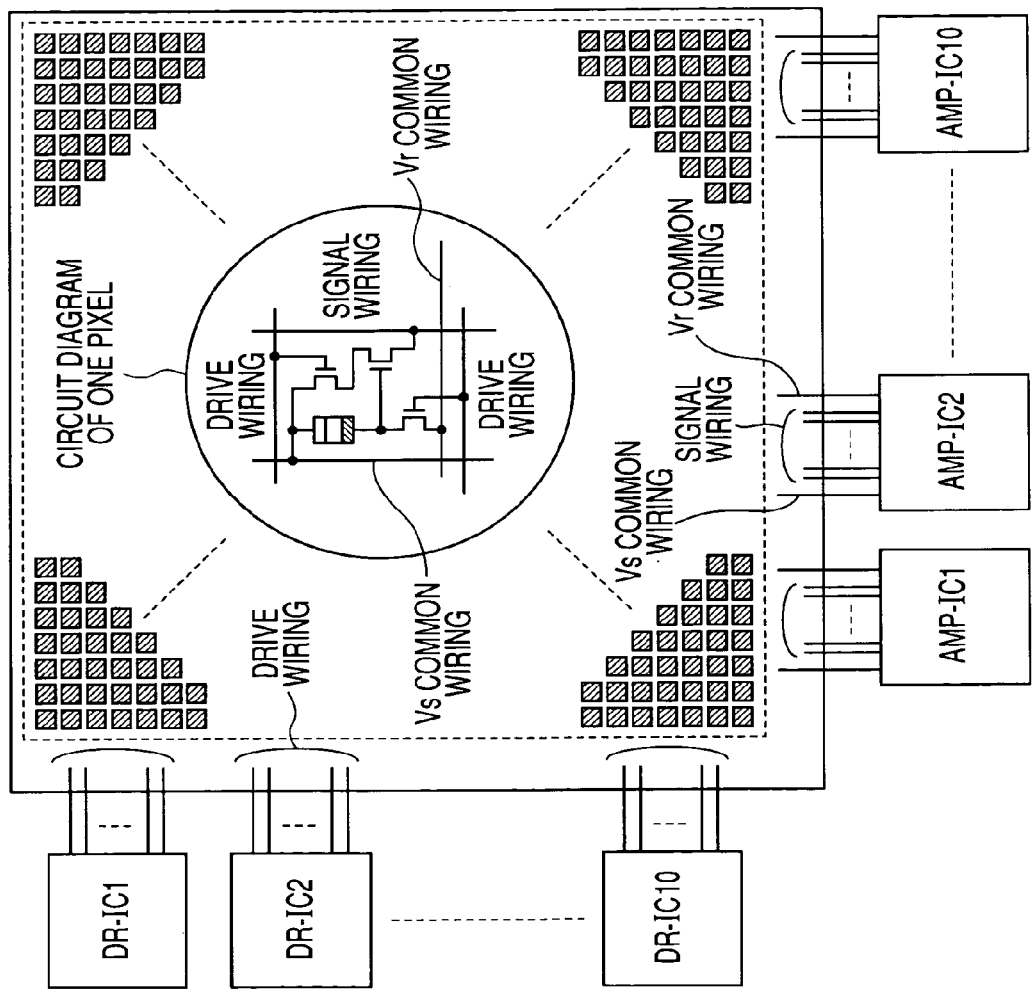
FIG. 9 is a schematic view showing a structure of an X-ray image pickup apparatus (radiation image pickup apparatus) of a fourth embodiment of the present invention.

Now, the fourth embodiment of the present invention is described below. FIG. 9 is a schematic view showing a structure of the X-ray image pickup apparatus (radiation image pickup apparatus) of the fourth embodiment of the present invention.

In the case of this embodiment, a readout circuit unit and a drive circuit unit are respectively divided into a plurality of blocks and are connected to a photoelectric conversion circuit unit. Black squares (|) in FIG. 9 respectively show one pixel and a circuit for the one pixel is shown in the circle (○) in FIG. 9. In the case of this embodiment, an MIS-type photoelectric converting device, first TFT, second TFT and third TFT are included in pixels similarly to the case of the second embodiment. However, it is allowed to use a PIN-type photoelectric converting device as a photoelectric converting device similarly to the case of the first embodiment.

Blocks of the readout circuit unit are shown as AMP-IC1 to AMP-IC10 and blocks of the drive circuit unit are shown as DR-IC1 to DR-IC10. A large-area radiographing region of 40×40 cm or more is generally requested because a medical X-ray image pickup apparatus is particularly used to radiograph the chest region of a human body. Moreover, it is said that 100 to 200 μm are necessary for the resolution of a pixel. For example, 2,500×2,500 pixels are required to cover the radiographing region of 40×40 cm at a resolution of 160 μm.

A readout circuit unit and a drive circuit unit are respectively fabricated as an integrated circuit (IC) by generally using silicon technology. A silicon wafer is cut out to a plurality of chips in accordance with the purpose and each chip is fabricated as an IC. In the case of this embodiment, one readout circuit unit is used as blocks for reading pixels for 256 columns. Moreover, one drive circuit unit is used as blocks for driving pixels for 256 rows. By allocating the units as described above, it is possible to respectively divide the readout circuit unit and the drive circuit unit into 10 blocks. Extra channels in the readout circuit unit, that is, (256×10)−2,500=60 channels are used to input GND potential or kept open. In the case of the configuration for resetting the N-th line and reading the (N+1)-th line at the same time (as shown in the first embodiment 1 and the second embodiment), the number of extra channels in the drive circuit unit becomes 59 channels because one more channel is used and the 59 channels are kept open.

Moreover, in the case of this embodiment, a bias power source for supplying a potential to the Vs common wiring and a reset power source for supplying the potential of the Vr common wiring are connected to each block of the readout circuit unit. However, it is allowed that only either of them is connected. By using the configuration shown in FIG. 9, a bias power source or reset power source is set nearby a photoelectric conversion circuit unit, impedances of the Vs common wiring and Vr common wiring are decreased and S/N becomes advantageous.

The bias power source is used to apply the sensor bias (Vs) or second refresh bias (Vref2) to one electrode of a sensor through the Vs common wiring when a photoelectric converting device is the MIS type but it is used to apply a sensor bias (Vs) to the one electrode when the device is the PIN type. Moreover, the reset power source is used to apply the reset bias (Vrst) or first refresh bias (Vref1) to the other electrode of the sensor through the Vr common wiring when the photoelectric converting device is the MIS type but it is used to apply the reset bias (Vrst) to the other electrode when the device is the PIN type.

In the case of this embodiment, one block of the readout circuit unit or drive circuit unit is set to 256 channels. However, the number of channels is not restricted to 256. It is possible to select the number of channels in accordance with the conciseness at the time of fabrication or yield of nondefective chips cut out from a wafer.

Fifth Embodiment

Figure 10:
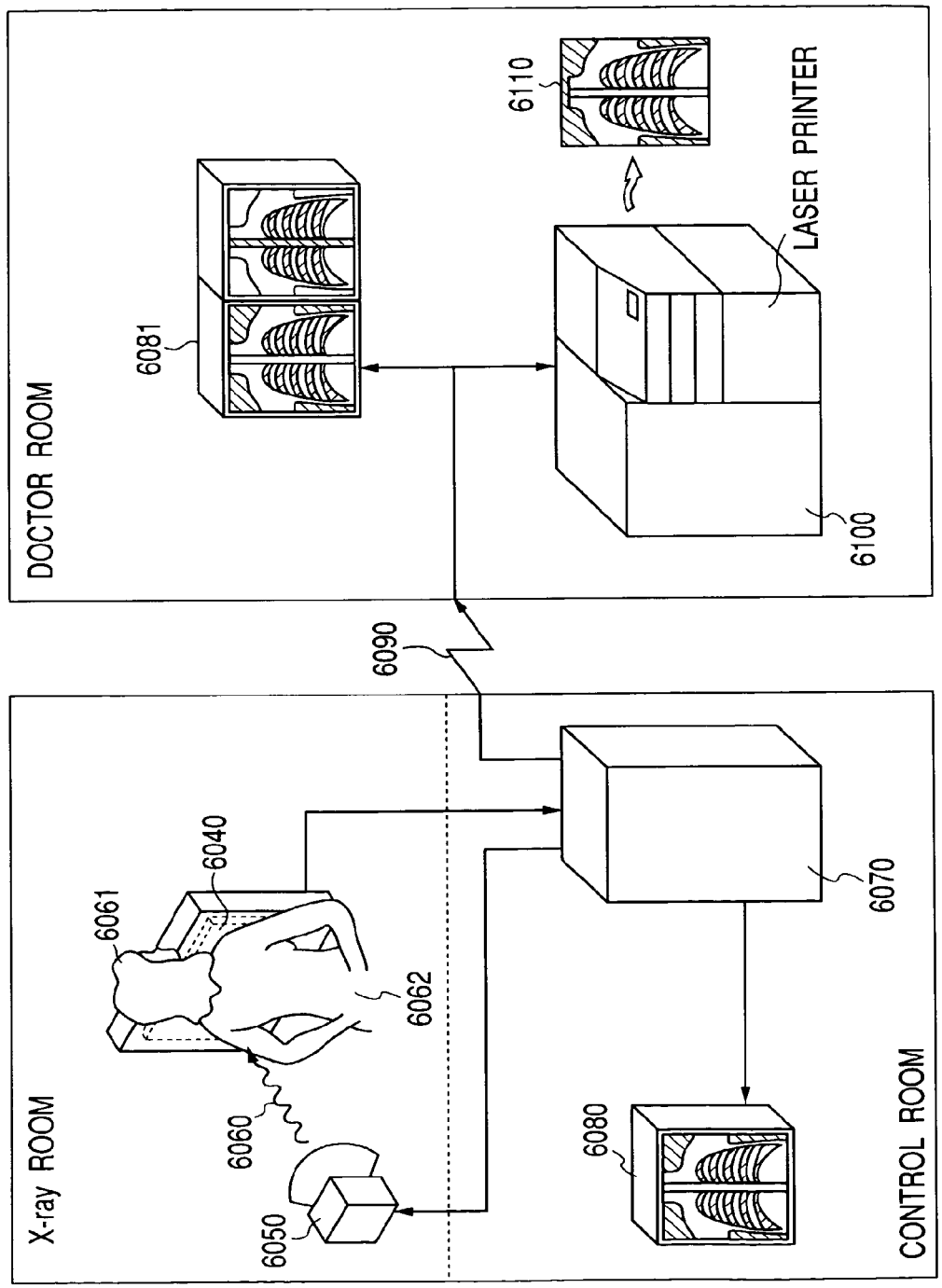
FIG. 10 is a schematic view showing an X-ray diagnostic system of a fifth embodiment of the present invention.
Figure 11:
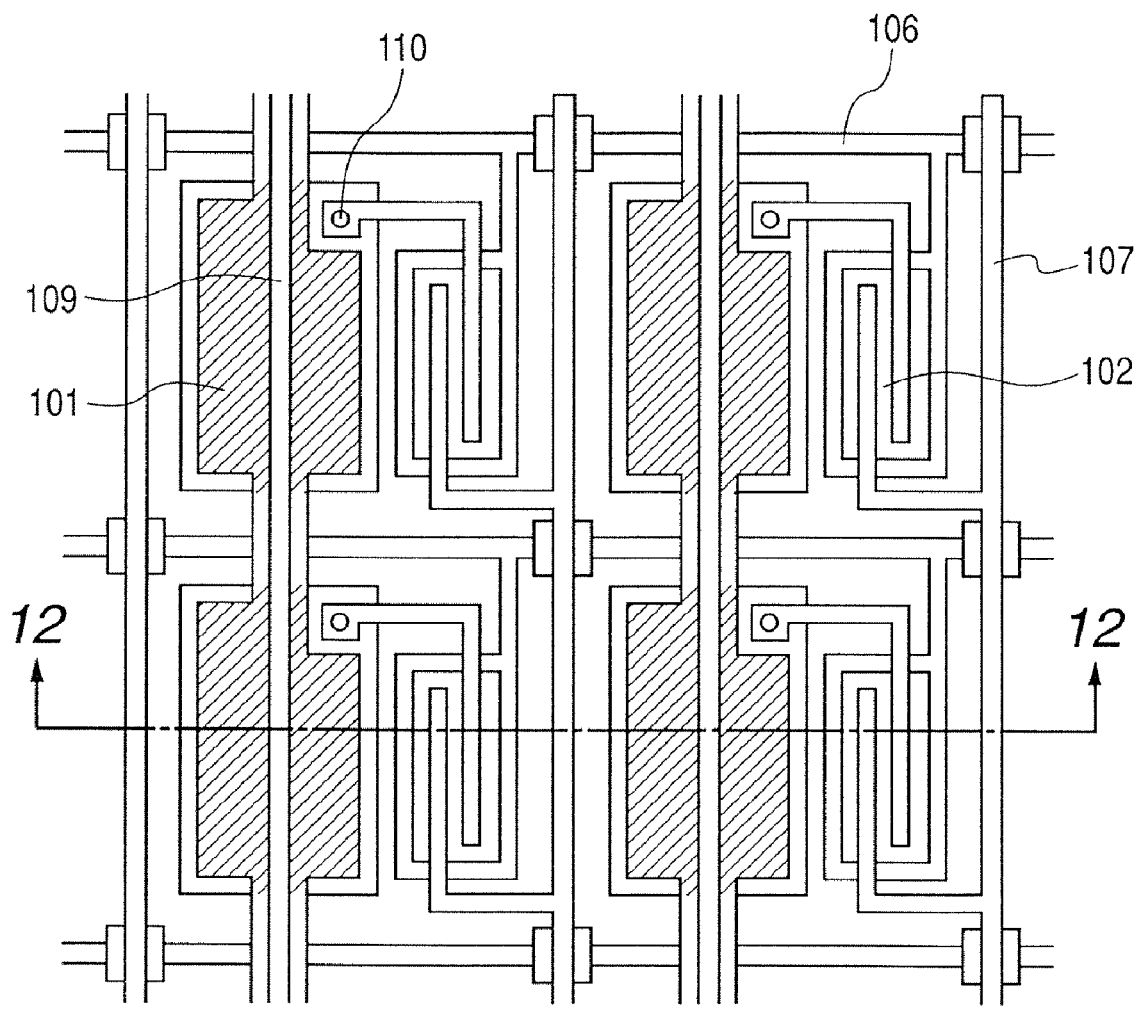
FIG. 11 is a top view showing a conventional photoelectric converting substrate provided with an MIS-type photoelectric converting device.
Figure 12:
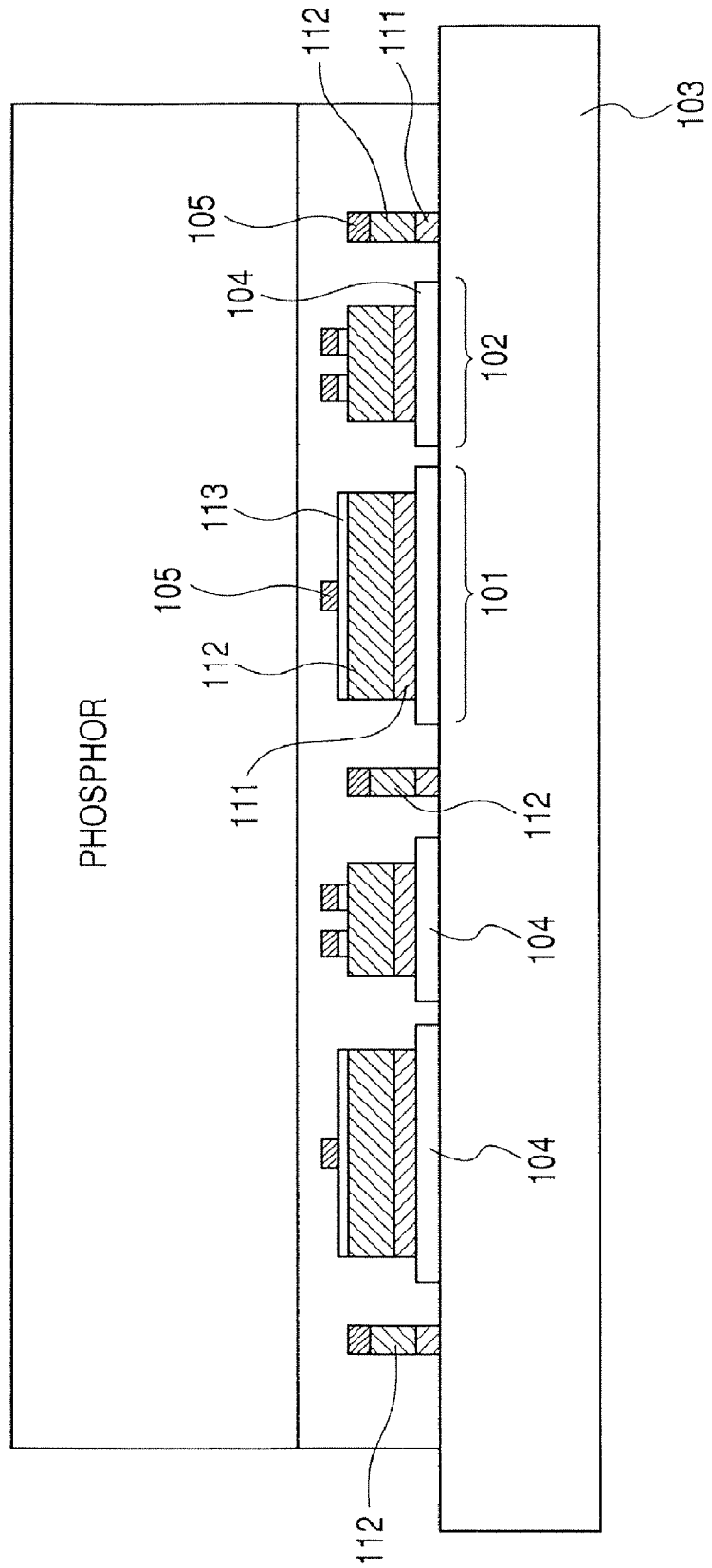
FIG. 12 a sectional view taken along the line 12-12 in FIG. 11.
Figure 13A:
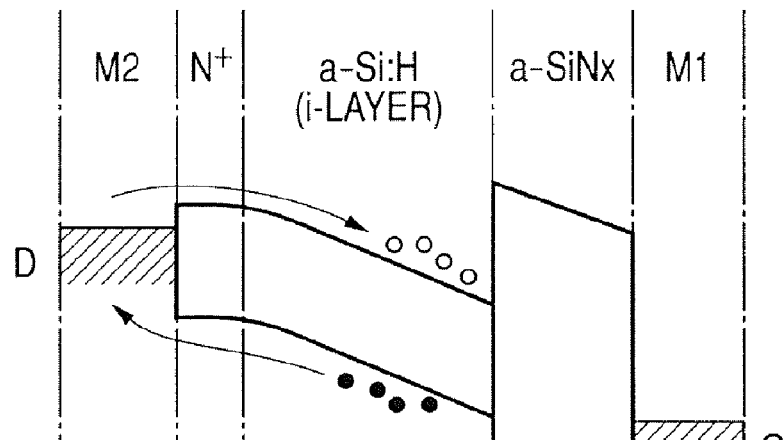
FIGS. 13A, 13B and 13C are energy band diagrams for explaining device operations of the photoelectric converting device shown in FIGS. 11 and 12.
Figure 13B:
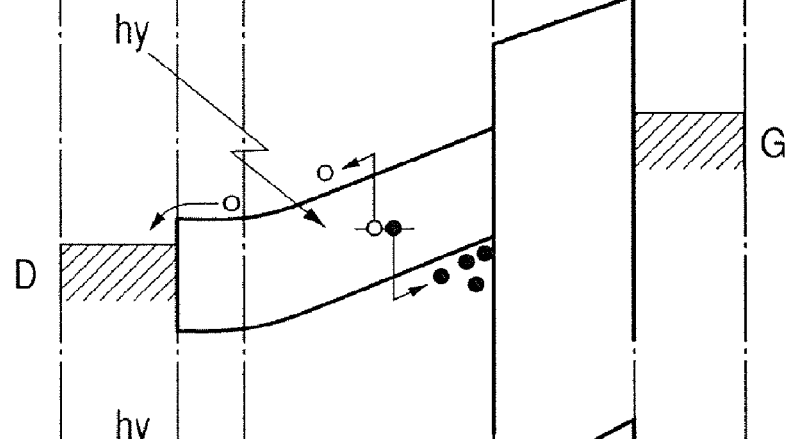
Figure 13C:
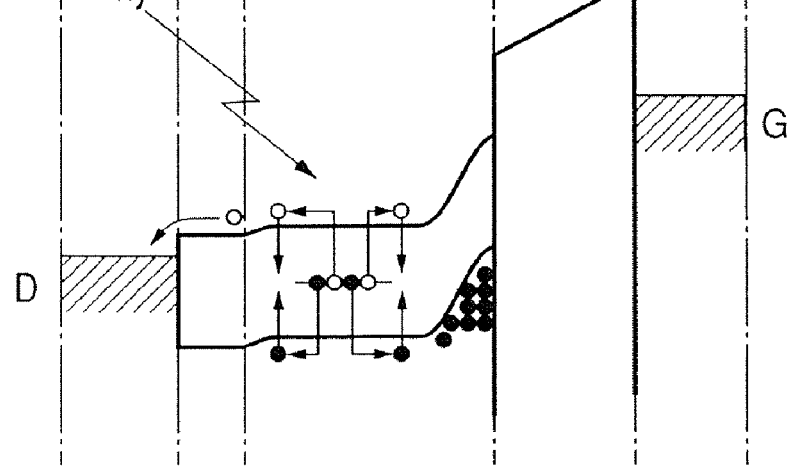
Figure 14:
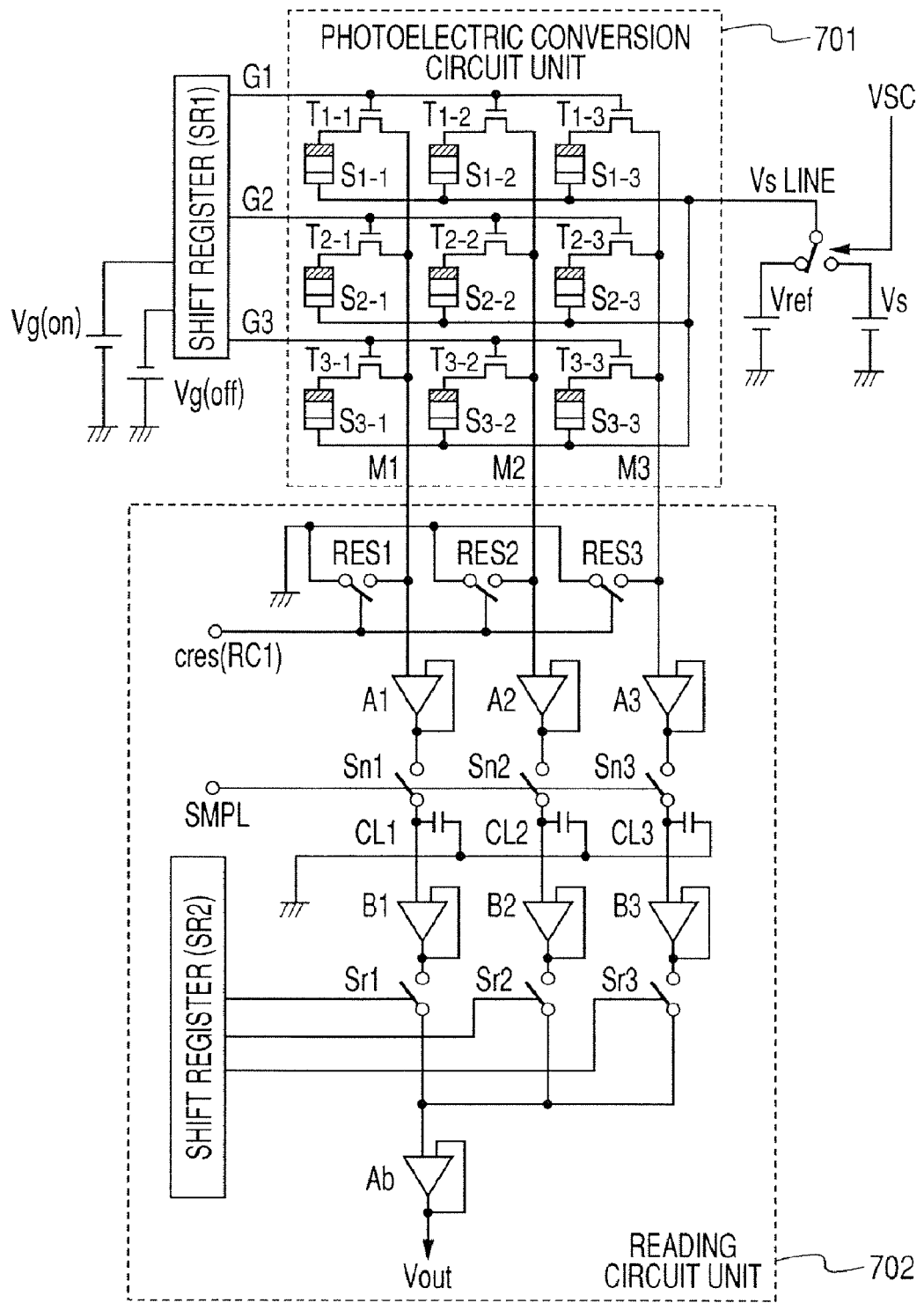
FIG. 14 is a circuit diagram showing a two-dimensional configuration of a conventional photoelectric converting substrate provided with an MIS-type photoelectric converting device.
Figure 15:
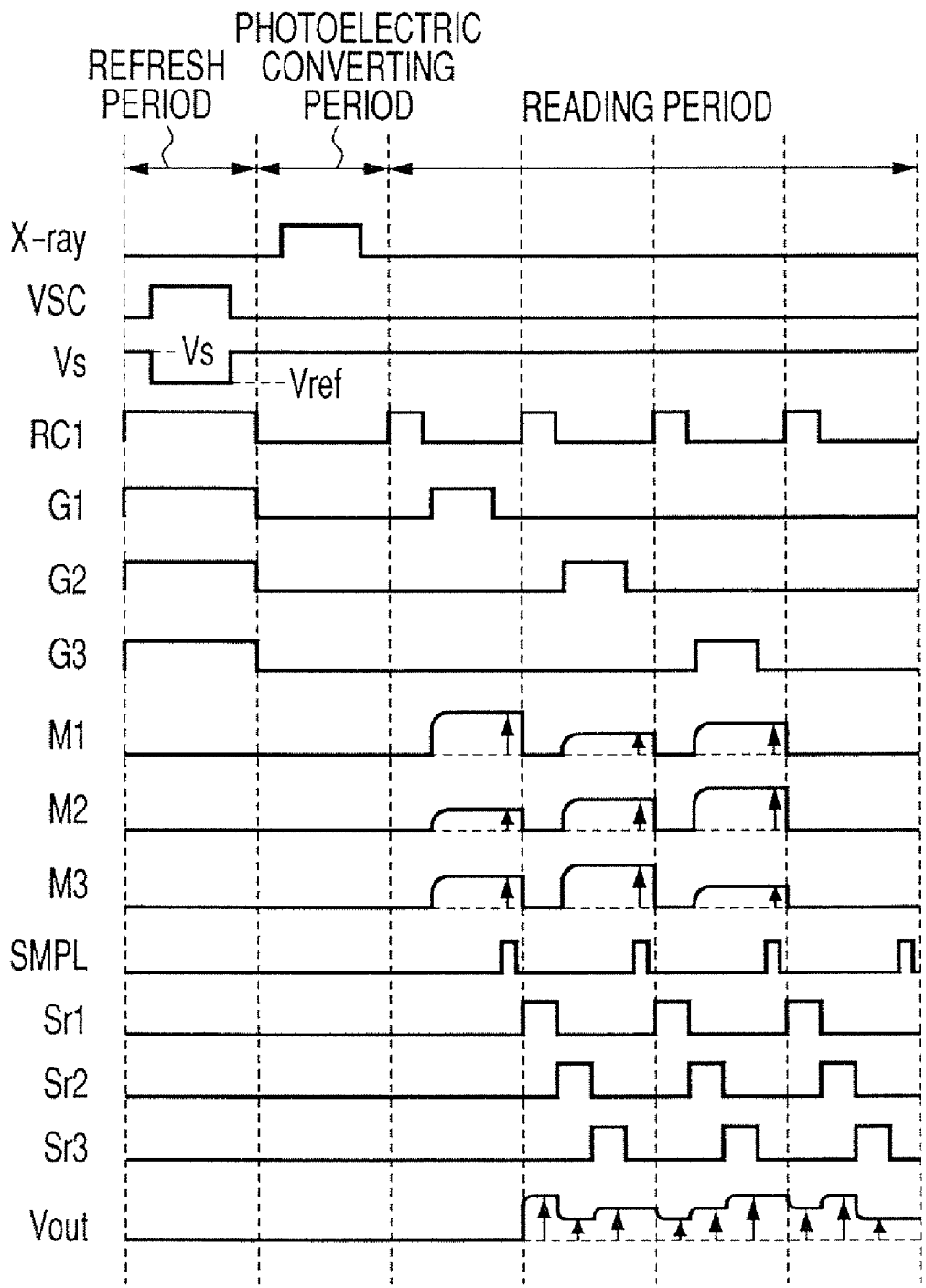
FIG. 15 is a time chart showing operations of the conventional photoelectric converting apparatus shown in FIG. 14.
Figure 16:
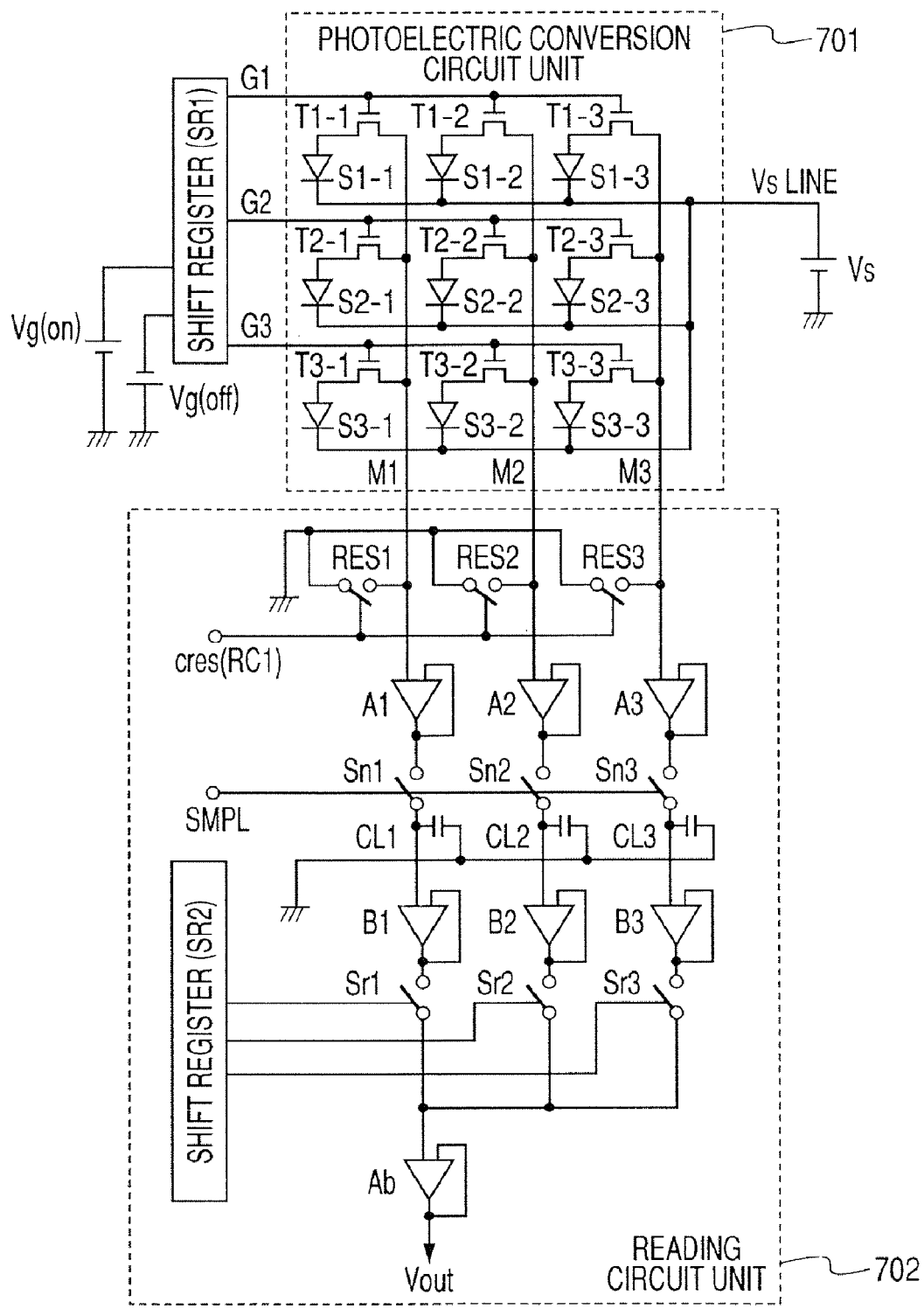
FIG. 16 is a circuit diagram showing two-dimensional configuration of a photoelectric converting apparatus using a PIN-type photoelectric converting device.
Figure 17:
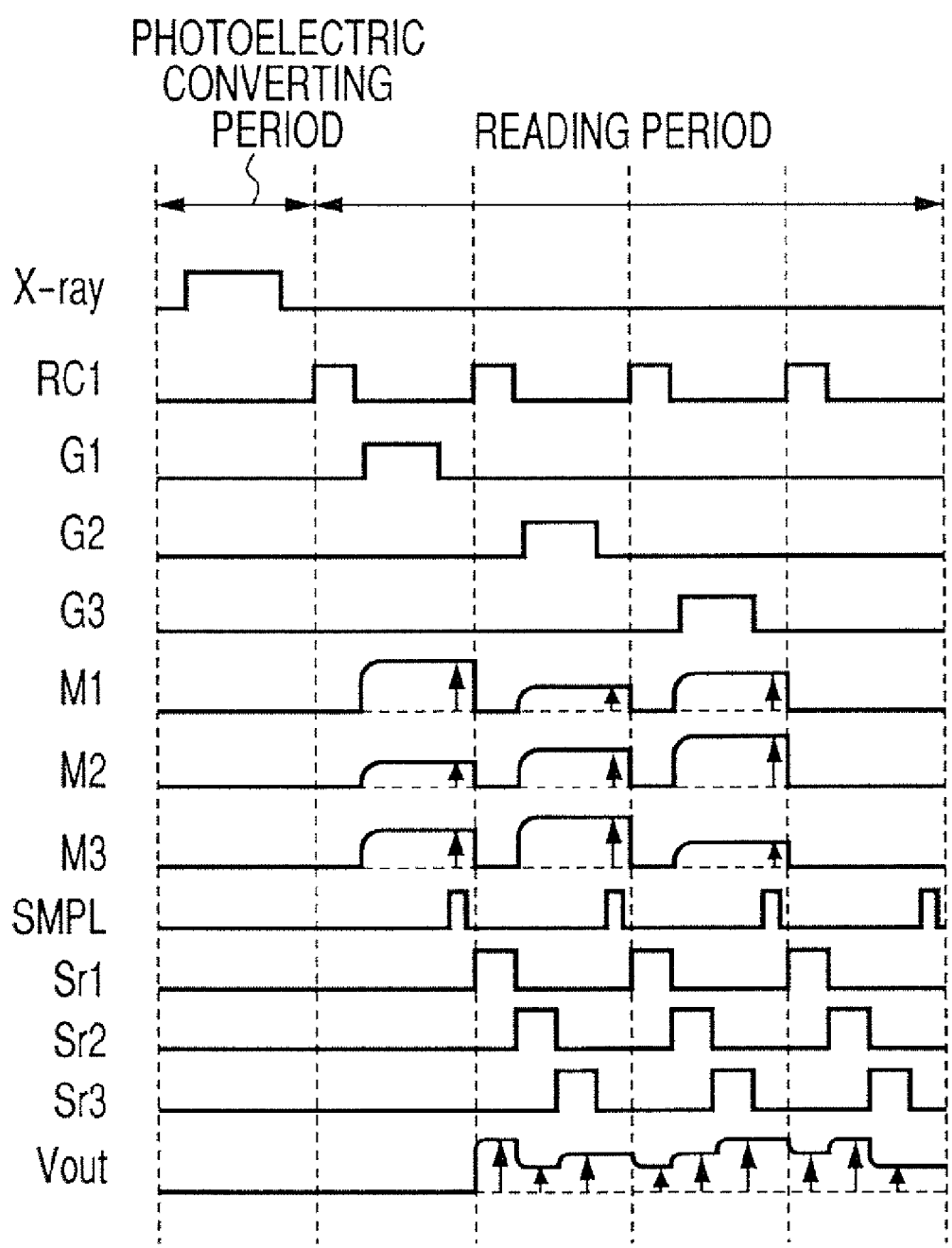
FIG. 17 is a time chart showing operations of the conventional photoelectric converting apparatus shown in FIG. 16.

Now, the fifth embodiment of the present invention is described below. The fifth embodiment is obtained by applying an X-ray image pickup apparatus (radiation image pickup apparatus) of the present invention to an X-ray diagnostic system. FIG. 10 is a schematic view showing the X-ray diagnostic system of the fifth embodiment of the present invention.

In an X-ray room (radiographing room), X rays 6060 generated in an X-ray tube (X-ray generator) 6050 passes through the chest region 6062 of a patient or test subject 6061 and enters an image sensor 6040. The information on the inside of the patient 6061 is included in the irradiated X-rays. A scintillator emits light in accordance with the irradiated of X-rays and the photoelectric converting device of a sensor panel photoelectric-converts the light emitted from the scintillator to obtain electrical information. The image sensor 6040 converts the information into electrical signals (digital signals) and outputs the signals to an image processor 6070. The image processor 6070 serving as image processing-means applies image processing to received signals and output the image-processed signals to a display 6080 serving as display means of a control room (operation room). A user can obtain the information on the inside of a patient 6061 by observing an image displayed on the display 6080. The image processor 6070 also has a function of control means and is able to switch the photographing mode of a dynamic image/static image or control the X-ray tube 6050.

Moreover, the image processor 6070 is able to transfer an electrical signal output from the image sensor 6040 to a distant place through transmission processing means such as a telephone line 6090 and display the signal on display means (display) 6081 at another place such as a doctor room. Furthermore, it is possible to store the electrical signal output from the image sensor 6040 in recording means such as an optical disk and for a distant-place doctor to perform diagnosis by using the recording means. Furthermore, it is possible to record the electrical signal in a film 6110 by a film processor 6100 serving as recording means.

The structure of a photoelectric converting device is not restricted. For example, it is allowed to use a photoelectric converting device using amorphous silicon as a main material, which absorbs the visible light supplied from a wavelength converting member for converting radiation into visible light and converts the visible light into electrical signals. As this type of device, the following are used: an PIN-type photoelectric converting device having a P layer doped with acceptor impurity, I layer which is an intrinsic semiconductor layer and N layer doped with donor impurity and an MIS-type photoelectric converting device having a metallic thin-film layer formed on a substrate, insulating layer formed on the metallic thin-film layer and formed of amorphous silicon nitride for preventing passage of electrons and holes, photoelectric converting layer formed of hydrogenated amorphous silicon formed on the insulating layer, N-type injection preventive layer formed on the photoelectric converting layer to prevent injection of holes and a conductive layer formed on the injection preventive layer. In the case of the MIS-type photoelectric converting device, it is allowed that the conductive layer is a transparent conductive layer and is formed on a part of the injection preventive layer. When these photoelectric converting devices are used and the wavelength converting member is necessary, it is possible to use a wavelength converting member mainly containing $Gd_2O_2S$, $Gd_2O_3$ or CsI. Moreover, as a photoelectric converting device, it is allowed to use a device which contains amorphous selenium, gallium arsenide, lead iodide or mercury iodide, absorbs applied radiation and directly converts the radiation into electrical signals.

Furthermore, the structure of a readout circuit unit is not restricted. For example, it is possible to use a readout circuit unit having amplifying means for amplifying signals read from a photoelectric conversion circuit unit, accumulating means for accumulating the signals amplified by the amplifying means and serial converting means for serial-converting the signals accumulated by the accumulating means.

An embodiment of the present invention can be realized when a computer executes a program. Moreover, means for supplying a program to a computer, for example, a computer-readable recording medium such as a CD-ROM recording the program or a transmission medium such as Internet for transmitting the program can be applied as an embodiment of the present invention. Furthermore, the above program can be applied as an embodiment of the present invention. The above program, recording medium, transmission medium and program product are included in the category of the present invention.

This application claims priority from Japanese Patent Application No. 2004-148051, filed on May 18, 2004, which is hereby incorporated by reference herein.

What is claimed is:

1. A radiation image pickup apparatus, comprising:
   a conversion circuit unit in which a plurality of pixels are two-dimensionally arranged on a substrate;
   a readout circuit unit for reading signals from the conversion circuit unit;
   a bias power source for supplying a converting bias to a conversion device for converting irradiated radiation into electrical signals; and
   a reset power source for supplying a reset bias to the conversion device,
   wherein each of the pixels includes the conversion device converting incident radiation into electrical signals and having a first electrode and a second electrode, a source-follower-type first field-effect transistor outputting the electrical signals generated by the conversion device and having a gate electrode connected to the first electrode, and a second field-effect transistor for resetting the conversion device, and
   wherein the readout circuit unit uses an integrated circuit and is mounted on a position nearby the conversion circuit unit, the bias power source is connected commonly to the second electrode of each of the pixels, the reset power source is connected commonly to the second field-effect transistor of each of the pixels, and at least one of the bias power source and the reset power source is set in the readout circuit.

2. The radiation image pickup apparatus according to claim 1, wherein the readout circuit unit is divided into a plurality of blocks and the reset power source is set in the readout circuit unit divided into a plurality of blocks.

3. The radiation image pickup apparatus according to claim 1, wherein the bias power source and the reset power source respectively supply the bias to the conversion devices through an operational amplifier.

4. The radiation image pickup apparatus according to claim 1,
   wherein each of the pixels further includes a third field-effect transistor to be turned on for outputting an electrical signal from the pixel selected by a drive circuit unit to the readout circuit unit.

5. The radiation image pickup apparatus according to claim 4, wherein each of the conversion devices comprises a wavelength converting member for converting the wavelength of the incident radiation and discharging visible light and a photoelectric converting device for converting the visible light into electrical signals.

6. The radiation image pickup apparatus according to claim 5, wherein each photoelectric converting device is a MIS-type photoelectric converting device,
   each MIS-type photoelectric converting device has a metallic thin-film layer formed on the substrate, an insulating layer formed on the metallic thin-film layer to prevent passage of electrons and holes, a photoelectric converting layer formed on the insulating layer, and an injection preventive layer formed on the photoelectric converting layer to prevent injection of holes and a conductive layer formed on the injection preventive layer,
   the radiation image pickup apparatus has at least a refresh mode and the operation mode of a photoelectric converting mode,
   an electric field is applied to each MIS-type photoelectric converting device in the direction for leading holes from the photoelectric converting layer to the conductive layer in the refresh mode,
   each MIS-type photoelectric converting device accumulates the holes generated in the photoelectric converting layer in the photoelectric converting mode and an electric field is applied to the MIS-type photoelectric converting device in the direction for leading the electrons generated in the photoelectric converting layer to the conductive layer, and
   the readout circuit unit detects either of the number of holes accumulated in the photoelectric converting layer and the number of electrons led to the conductive layer as optical signals in the photoelectric converting mode.

7. The radiation image pickup apparatus according to claim 6, wherein the bias power source has first bias switching means for switching a bias to be supplied to one electrode of the MIS-type photoelectric converting device between a photoelectric converting bias and first refreshing bias, and
   the reset power source has second bias switching means for switching a bias to be supplied to the other electrode of the MIS-type photoelectric converting device between a reset bias and second refresh bias.

8. The radiation image pickup apparatus according to claim 7, wherein the first refresh bias is used to refresh the MIS-type photoelectric converting devices for obtaining a dynamic image and the second refresh bias is used to refresh the MIS-type photoelectric converting devices when obtaining a static image.

9. The radiation image pickup apparatus according to claim 1, wherein the readout circuit unit further includes an amplifying unit for amplifying signals output from the conversion circuit unit, an accumulating unit for temporarily accumulating the output signals amplified by the amplifying unit, and a serial converting unit for serial-converting the output signals accumulated by the accumulating unit.

10. The radiation image pickup apparatus according to claim 1, wherein an amorphous silicon semiconductor is used as a main material of the conversion device and of the first and second field-effect transistors.

11. The radiation image pickup apparatus according to claim 1, further comprising:
a drive circuit unit for driving the conversion circuit unit, wherein the drive circuit turns on the second field-effect transistors when the reset power source supplies the reset bias to the conversion devices.

12. A radiation image pickup system, comprising:
the radiation image pickup apparatus according to claim 1; and
a radiation generating unit for generating radiation toward the conversion circuit unit.

* * * * *